(12) United States Patent
Hane

(10) Patent No.: US 12,433,478 B2
(45) Date of Patent: Oct. 7, 2025

(54) PROCESSING DEVICE, ENDOSCOPE SYSTEM, AND METHOD FOR PROCESSING CAPTURED IMAGE

(71) Applicant: OLYMPUS CORPORATION, Tokyo (JP)

(72) Inventor: Jun Hane, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 516 days.

(21) Appl. No.: 17/896,271

(22) Filed: Aug. 26, 2022

(65) Prior Publication Data

US 2022/0409030 A1     Dec. 29, 2022

Related U.S. Application Data

(63) Continuation of application No. PCT/JP2020/007975, filed on Feb. 27, 2020.

(51) Int. Cl.
*A61B 1/045* (2006.01)
*A61B 1/00* (2006.01)
*G06T 7/00* (2017.01)

(52) U.S. Cl.
CPC .......... *A61B 1/045* (2013.01); *A61B 1/00009* (2013.01); *G06T 7/0012* (2013.01); *A61B 1/00045* (2013.01); *G06T 2207/10024* (2013.01); *G06T 2207/10068* (2013.01)

(58) Field of Classification Search
None
See application file for complete search history.

(56) References Cited

U.S. PATENT DOCUMENTS

2011/0251454 A1   10/2011  Robb et al.
2015/0216392 A1   8/2015   Tojo et al.
(Continued)

FOREIGN PATENT DOCUMENTS

JP     2012-509715 A     4/2012
JP     2014079377 A      5/2014
(Continued)

OTHER PUBLICATIONS

Japanese Office Action dated Sep. 12, 2023 received in 2022-502698.
(Continued)

*Primary Examiner* — Mark R Milia
(74) *Attorney, Agent, or Firm* — Scully, Scott, Murphy & Presser, P.C.

(57) ABSTRACT

A processing device includes a processor, the processor being configured to: acquire a captured image of an inside of a lumen; acquire lumen structure information indicating a structure of the lumen; determine whether the captured image can be analyzed or not and output analysis allowability/non-allowability information indicating whether the captured image is in an analysis allowable state or not based on the captured image and first determination criteria; associate the analysis allowability/non-allowability information with the structure of the lumen based on the analysis allowability/non-allowability information and the lumen structure information to identify an analyzable portion and an unanalyzable portion of the structure of the lumen; and determine that the identified unanalyzable portion is a missed portion based on position and orientation information of a distal end of an insertion section to be inserted in the lumen and second determination criteria.

19 Claims, 14 Drawing Sheets

(56) References Cited

U.S. PATENT DOCUMENTS

| | | |
|---|---|---|
| 2015/0313445 A1 | 11/2015 | Davidson et al. |
| 2016/0166133 A1 | 6/2016 | Chiba et al. |
| 2017/0039707 A1 | 2/2017 | Akimoto et al. |
| 2017/0251159 A1 | 8/2017 | Ho Duc et al. |
| 2018/0084970 A1 | 3/2018 | Harada et al. |
| 2018/0214006 A1 | 8/2018 | Akimoto et al. |
| 2018/0368658 A1 | 12/2018 | Yamamoto |
| 2020/0237184 A1 | 7/2020 | Shigeta |

FOREIGN PATENT DOCUMENTS

| | | |
|---|---|---|
| JP | 2017158627 A | 9/2017 |
| JP | 2017534322 A | 11/2017 |
| JP | 2018050890 A | 4/2018 |
| WO | 2015029970 A1 | 3/2015 |
| WO | 2015194242 A1 | 12/2015 |
| WO | 2016076262 A1 | 5/2016 |
| WO | 2017057330 A1 | 4/2017 |
| WO | 2019/078237 A1 | 4/2019 |
| WO | 2019087969 A1 | 5/2019 |

OTHER PUBLICATIONS

Armin, Mohammad Ali et al., "Automated visibility map of the internal colon surface from colonoscopy video", International Journal of Computer Assisted Radiology and Surgery (2016), vol. 11, Issue No. 9, p. 1599-1610, cited in spec on pp. 1 and 5.
International Search Report dated Apr. 14, 2020 issued in PCT/JP2020/007975.

PROCESSING DEVICE, ENDOSCOPE SYSTEM, AND METHOD FOR PROCESSING CAPTURED IMAGE

CROSS REFERENCE TO RELATED APPLICATION

This application is a continuation of International Patent Application No. PCT/JP2020/007975, having an international filing date of Feb. 27, 2020, which designated the United States, the entirety of which is incorporated herein by reference.

BACKGROUND

Conventionally, endoscopes have been widely used in the medical and industrial fields. For example, in the medical field, a physician can perform an endoscopy or other procedures as he/she inserts an insertion section of an endoscope into a subject and observes the inside of the subject by viewing captured images displayed on a display device.

A method of constructing a three-dimensional model of an intestinal tract based on a video captured by an endoscope has been studied for the purpose of, for example, identifying areas left unobserved by a colonoscope. For example, Mohammad Ali Armin et al. disclose a method of generating a map of the surface of the large intestine using a cylinder model ("Automated visibility map of the internal colon surface from colonoscopy video", International Journal of Computer Assisted Radiology and Surgery, 2016, Volume 11, Issue number 9, p. 1599-1610).

SUMMARY

In accordance with one of some aspect, there is provided a processing device comprising a processor including hardware, the processor being configured to acquire a captured image of an inside of a lumen, acquire lumen structure information indicating a structure of the lumen, determine whether the captured image can be analyzed or not and output analysis allowability/non-allowability information indicating whether the captured image is in an analysis allowable state or not based on the captured image and first determination criteria, associate the analysis allowability/non-allowability information with the structure of the lumen based on the analysis allowability/non-allowability information and the lumen structure information to identify an analyzable portion and an unanalyzable portion of the structure of the lumen, and determine that the identified unanalyzable portion is a missed portion based on position and orientation information of a distal end of an insertion section to be inserted in the lumen and second determination criteria.

In accordance with one of some aspect, there is provided an endoscope system comprising: a processor including hardware; and an imaging device capturing an image of an inside of a lumen, the processor being configured to acquire a captured image based on the imaging device, acquire lumen structure information indicating a structure of the lumen, determine whether the captured image can be analyzed or not and output analysis allowability/non-allowability information indicating whether the captured image is in an analysis allowable state or not based on the captured image and first determination criteria, associate the analysis allowability/non-allowability information with the structure of the lumen based on the analysis allowability/non-allowability information and the lumen structure information to identify an analyzable portion and an unanalyzable portion of the structure of the lumen, and determine that the identified unanalyzable portion is a missed portion based on position and orientation information of a distal end of an insertion section to be inserted in the lumen and second determination criteria.

20. In accordance with one of some aspect, there is provided a method for processing a captured image, the method comprising acquiring a captured image capturing an inside of a lumen, acquiring lumen structure information indicating a structure of the lumen, determining whether the captured image can be analyzed or not and outputting analysis allowability/non-allowability information indicating whether the captured image is in an analysis allowable state or not based on the captured image and first determination criteria, associating the analysis allowability/non-allowability information with the structure of the lumen based on the analysis allowability/non-allowability information and the lumen structure information to identify an analyzable portion and an unanalyzable portion of the structure of the lumen, and determining that the identified unanalyzable portion is a missed portion based on position and orientation information of a distal end of an insertion section to be inserted in the lumen and second determination criteria.

DESCRIPTION OF EXEMPLARY EMBODIMENTS

Figure 1:
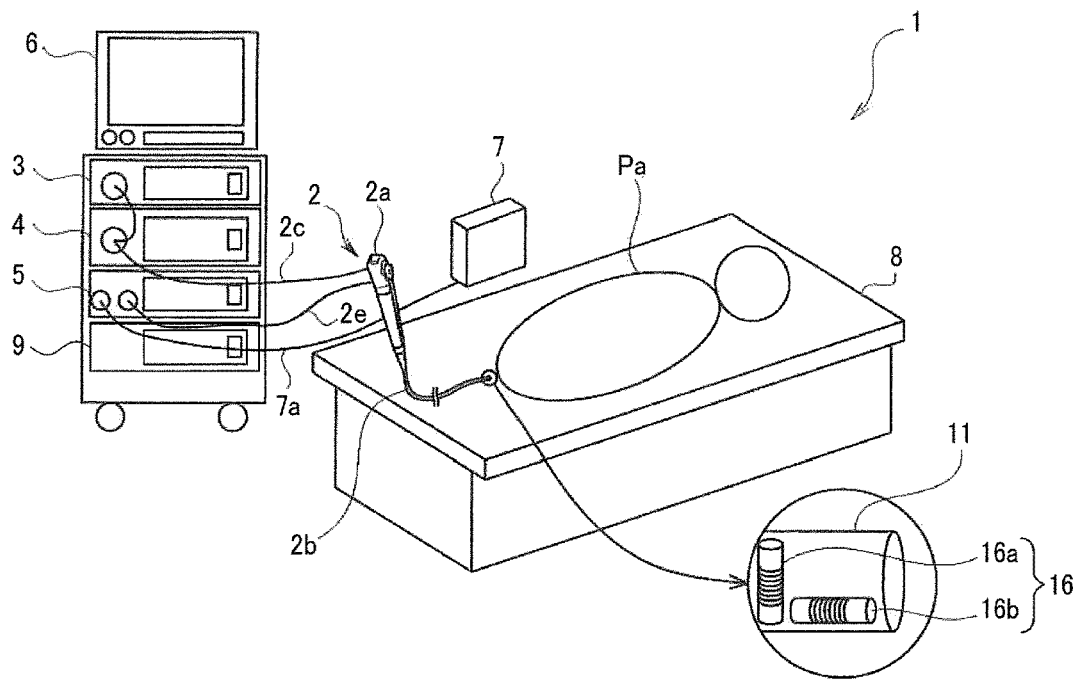
FIG. 1 illustrates an example configuration of an endoscope system.

The following disclosure provides many different embodiments, or examples, for implementing different features of the provided subject matter. These are, of course, merely examples and are not intended to be limiting. In addition, the disclosure may repeat reference numerals and/or letters in the various examples. This repetition is for the purpose of simplicity and clarity and does not in itself dictate a relationship between the various embodiments and/or configurations discussed. Further, when a first element is described as being "connected" or "coupled" to a second element, such description includes embodiments in which the first and second elements are directly connected or coupled to each other, and also includes embodiments in which the first and second elements are indirectly connected or coupled to each other with one or more other intervening elements in between.

Exemplary embodiments are described below. Note that the following exemplary embodiments do not in any way limit the scope of the content defined by the claims laid out herein. Note also that all of the elements described in the present embodiment should not necessarily be taken as essential elements.

1. Example System Configuration

In inspections using an endoscope system, it is important to reduce missing of regions of interest. The region of interest refers to a region that has a relatively higher observation priority than other regions for a user. If the user is a physician who performs diagnosis and treatment, the region of interest corresponds to, for example, a region including a lesion site. However, if an object that the physician wants to observe is bubbles or residue, the region of interest may be a region including the bubble or residue portion. In other words, an object that should be noted by the user varies depending on the purpose of an observation, and a region with a relatively higher observation priority than other regions for the user during the observation is the region of interest.

An example is described below where the endoscope system is an in-vivo observation system and the object for observation is the large intestine. That is, the lumen described below in the present embodiment is, in a narrow sense, the intestinal tract. However, the method of the present embodiment may be applied to lumens other than the intestinal tract. For example, the method may be applied to digestive tracts other than the large intestine, or lumen structures in other parts of a living body. The endoscope system may also be an industrial endoscope used for observation of luminal components. In the example discussed below, the region of interest is a lesion, but the region of interest can be extended beyond the lesion, as described above.

Conventionally, it has been difficult to have an accurate picture of which portion of the lumen is observed and how the endoscope is being moved thereon. More specifically, it has been difficult to accurately grasp relationship between a position and orientation of a distal end of an insertion section and a lumen. Additionally, it has been difficult to have an accurate picture of which portion of the lumen is thus being imaged and under what imaging conditions the imaging is performed. Therefore, it was not easy to accurately determine presence or absence of a missed object or to quantify missing. To address this, there has been disclosed a method of estimating a three-dimensional model of the intestinal tract based on a two-dimensional captured image, as in Mohammad Ali Armin et al., "Automated visibility map of the internal colon surface from colonoscopy video", International Journal of Computer Assisted Radiology and Surgery, 2016, Volume 11, Issue number 9, p. 1599-1610. In the method disclosed by Mohammad Ali Armin et al. ("Automated visibility map of the internal colon surface from colonoscopy video", International Journal of Computer Assisted Radiology and Surgery, 2016, Volume 11, Issue number 9, p. 1599-1610), it is possible to associate as to which portion of the intestinal tract is imaged in a given captured image. It is sufficient for the method of the present embodiment that a captured image can be associated with the lumen structure, and a specific method can be modified in various ways as described below.

In order to reduce missing of lesions, the lesion must be imaged on at least one captured image. That is, it is important to exhaustively capture an entire inner surface of the lumen structure such as an intestinal tract to reduce missing. For example, in the method of Mohammad Ali Armin et al. ("Automated visibility map of the internal colon surface from colonoscopy video", International Journal of Computer Assisted Radiology and Surgery, 2016, Volume 11, Issue number 9, p. 1599-1610), completion of construction of a three-dimensional model serves as a condition for finishing observation using an endoscope system, thereby enabling to reduce missing.

However, in inspections using an endoscope system, it is important whether desired analysis can be performed based on a captured image or not. For example, if the region of interest is a lesion, the analysis may be a process of detecting the lesion from the captured image or a process of classifying the lesion according to its malignancy. Therefore, in the present embodiment, missed portion determination is performed under a condition that the lesion is in an analysis allowable state as well as a condition that the lesion is imaged in the captured image.

To ensure that a lesion possibly present on a surface of an intestinal tract is to be imaged, it is important to capture the entire desired range of the intestinal tract within a field of view of an imaging section. The field of view of the imaging section represents a given space determined by a direction of the optical axis of the imaging section and an angle of view thereof. For example, the field of view of the imaging section is a space of a pyramidal or conical shape with a position corresponding to the imaging section being the vertex and with the optical axis of the imaging section passing through the vertex and the center of the base. Directing the optical axis of the imaging section in the direction in which the lesion is present or in a direction close to that direction makes it possible to capture the lesion in the field of view.

It should be noted, however, there is a possibility of missing a lesion located within the field of view of the imaging section. First, there is a possibility of missing a lesion when there is a portion that is within the field of view of the imaging section and appears on the captured image, but there is a portion that is imaged under bad imaging conditions. Second, it is a case in which there is a portion that is within the field of view of the imaging section but does not appear on the captured image.

The bad imaging conditions correspond to a case where a resolution is low or the like because of, for example, the distance between the imaging section and a lesion being far, or the lesion being imaged from an oblique direction. The low resolution specifically means that a size of the lesion in the image is considerably small. In the portion imaged under bad imaging conditions, imaging itself has been performed, but accuracy of lesion detection or malignancy determination is low, so that the desired analysis cannot be performed. Therefore, in the method of the present embodiment, when there is a portion imaged under bad imaging conditions, it is determined that there is a risk of missing a lesion.

Further, the portion not appearing on the captured image corresponds to a portion obstructed by an obstacle, for example. The obstacle herein is an object other than the intestinal tract, such as residue, bubbles, dirty water, or a hemostatic clip. Since the portion of the intestinal tract that is obstructed by the obstacle is not visible on the captured image, a lesion behind the obstacle is to be missed. Therefore, when there is an obstacle, it is also determined that there is a risk of missing the lesion. Further, the portion that is within the field of view of the imaging section but does not appear on the captured image also includes a hidden portion generated due to the lumen structure such as a fold. The hidden portion is, for example, a back side of the fold. The back side of the fold represents the surface positioned at the opposite side to the imaging section. The back side of the fold is obstructed by the surface of the fold on the side of the imaging section, and therefore not imaged in the captured image even if it is within the field of view.

In the method of the present embodiment, a portion of the intestinal tract, that is within the field of view of the imaging section, appears on the captured image, and is imaged under good imaging conditions, is determined to be an analyzable portion, while other portions are determined to be an unanalyzable portion. In other words, as determination criteria of whether a given region of the lumen structure is missed or not, the method of the present embodiment uses criteria of whether the given region is imaged or not as well as whether the region is in an analysis allowable state or not. A specific process for distinguishing between the analyzable portion and the unanalyzable portion is described later.

As the above description shows, there are three possible states of the unanalyzable portion. In the method of the present embodiment, the unanalyzable portion may be classified into any of the following (1) to (3). For example, a processing device 9 performs a process of displaying the following portions (1) to (3) in different forms when displaying the unanalyzable portions. For convenience of description, the unanalyzable portion classified into (1) is also referred to as a first unanalyzable portion. Similarly, the unanalyzable portions classified into (2) and (3) are also referred to as a second unanalyzable portion and a third unanalyzable portion, respectively. In a case of no classification required, all the following (1) to (3) are simply referred to as an unanalyzable portion. The specific classification process is described later. Further, the classification is not limited to the following three categories, and may be further subdivided.

(1) A portion that is within the field of view of the imaging section and appears on the captured image, but is imaged under bad imaging conditions.
(2) A portion that is within the field of view of the imaging section but does not appear on the captured image.
(3) A portion that has never been in the field of view of the imaging section.

The processing device 9 of the present embodiment determines whether a subject can be analyzed or not based on, for example, a captured image acquired by the imaging section of the endoscope system. The processing device 9 then associates the determination result with lumen structure information indicating the lumen structure. For example, the processing device 9 performs a process of mapping a region on the image, which is determined to be analyzable based on the captured image, onto the lumen structure. This makes it possible to identify which portion of the lumen structure is determined to be analyzable and which portion is determined to be unanalyzable. For example, the processing device 9 may display the result of the association process to present a portion of the lumen structure not imaged in an analysis allowable state. The presentation may be performed during observation using the endoscope system or after the end of the observation. During observation herein refers to a state in which observation of the subject using the endoscope system is ongoing, specifically, a state in which a single inspection or diagnosis is ongoing. After the end of the observation is after the end of the inspection or diagnosis.

FIG. 1 illustrates an example configuration of an endoscope system 1 comprising the processing device 9 according to the present embodiment. The endoscope system 1 includes an endoscope 2, an image processing device 3, a light source device 4, a lumen structure detection device 5, a monitor 6 which is a display device, a magnetic field generating device 7, and the processing device 9. A physician can perform the large intestine endoscopy to a patient Pa who is lying on his/her back on a bed 8, using the endoscope system 1.

However, the configuration of the endoscope system 1 is not limited to the one illustrated in FIG. 1. For example, the processing device 9 may be configured integrally with the image processing device 3. Further, as described below, the processing device 9 may be configured integrally with the lumen structure detection device 5. The lumen structure detection device 5 may also include the magnetic field generating device 7. Further, the lumen structure detection device 5 may be configured without a magnetic sensor 16, and in that case, the magnetic field generating device 7 can be omitted. When using the lumen structure information acquired in advance, the lumen structure detection device 5 can be omitted. Additionally, the endoscope system 1 can be implemented in various modifications, such as omitting some of the components shown in FIG. 1 or adding other components.

Although FIG. 1 illustrates an example in which the image processing device 3, the lumen structure detection device 5, and the processing device 9 are provided near the endoscope 2, the configuration is not limited thereto. For example, some or all of these devices may be constructed through a server system or the like that can be connected via a network. In other words, devices such as the processing device 9 may be implemented by cloud computing. The network as referred to herein may be a private network such as an intranet or a public communication network such as the Internet. The network may also be wired connections or wireless.

Figure 2:
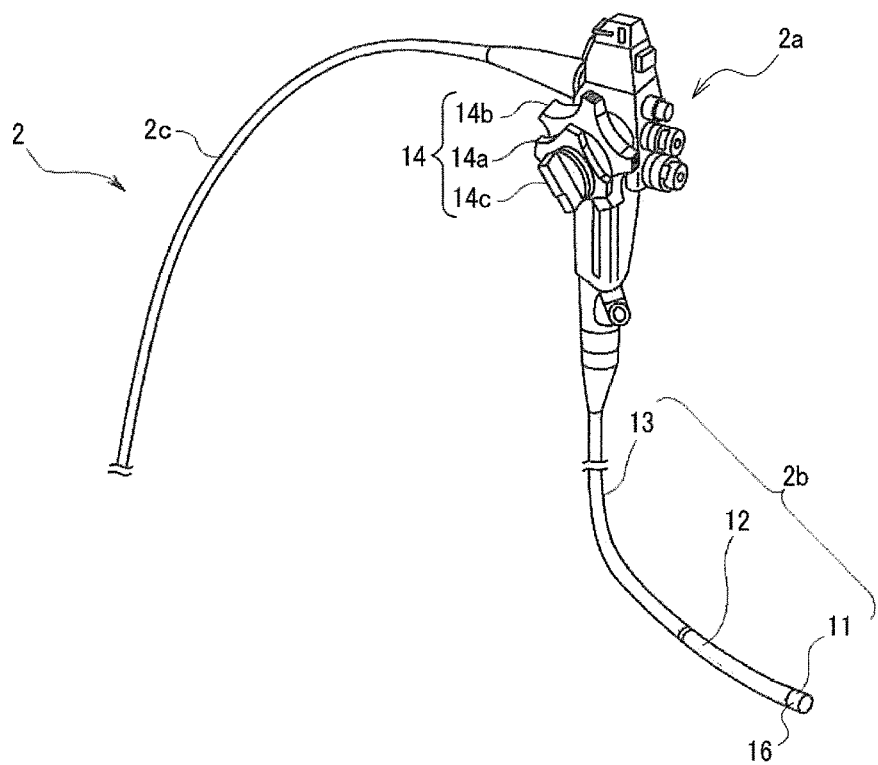
FIG. 2 illustrates an example configuration of an endoscope.

FIG. 2 is a perspective diagram of the endoscope 2. The endoscope 2 has an operation section 2a, a flexible insertion section 2b, and a universal cable 2c including such as signal lines. The endoscope 2 is a tubular insertion device with the tubular insertion section 2b to be inserted into a body cavity. A connector is provided at the leading end of the universal cable 2c, and the endoscope 2 is detachably connected to the light source device 4 and the image processing device 3 by the connector. The endoscope 2 as referred to herein is an endoscope that can be inserted into the large intestine. Furthermore, although not shown, a light guide is inserted through the universal cable 2c, and the endoscope 2 emits illumination light emitted from the light source device 4 from the leading end of the insertion section 2b through the light guide.

As illustrated in FIG. 2, the insertion section 2b has a distal end section 11, a curving section 12 capable of curving, and a flexible tube 13 from the leading end to the base end of the insertion section 2b. The insertion section 2b is inserted into the lumen of the subject patient Pa. The base end portion of the distal end section 11 is connected to the leading end of the curving section 12, and the base end portion of the curving section 12 is connected to the leading end of the flexible tube 13. The distal end section 11 of the insertion section 2b is the distal end section of the endoscope 2, which is the hard rigid leading end.

The curving section 12 can be curved in a desired direction in accordance with the operation to a curving operation member 14 provided in the operation section 2a. The curving operation member 14 includes, for example, a left/right curving operation knob 14a and an up/down curving operation knob 14b. When the curving section 12 is curved to change the position and direction of the distal end section 11 to capture an observation site within the subject in the field of view, illumination light is irradiated to the observation site. The curving section 12 has a plurality of curved pieces coupled along the longitudinal axis direction of the insertion section 2b. Thus, a physician can observe the inside of the large intestine of the patient Pa by curving the curving section 12 in various directions while pushing the insertion section 2b into or pulling it out of the large intestine.

The left/right curving operation knob 14a and the up/down curving operation knob 14b pull or relax an operation wire inserted into the insertion section 2b to curve the curving section 12. The curving operation member 14 further has a fixing knob 14c that fixes the position of the curving section 12 in a curved state. In addition to the curving operation member 14, the operation section 2a is also provided with various operation buttons, such as a release button and an air and water supply button.

The flexible tube 13 is flexible and bends in response to external force. The flexible tube 13 is a tubular member extending from the operation section 2a.

Further, the distal end section 11 of the insertion section 2b is provided with an image sensor 15 that is an imaging device. The observation site in the large intestine illuminated by the illumination light from the light source device 4 is imaged by the image sensor 15. In other words, the image sensor 15 is arranged in the distal end section 11 of the insertion section 2b and constitutes the imaging section for capturing an image of an inside of the subject to acquire a captured image. Imaging signals obtained by the image sensor 15 are supplied to the image processing device 3 via the signal lines in the universal cable 2c. Note that the position of the image sensor 15 to be provided is not limited to the distal end section 11 of the insertion section 2b. For example, the light from the subject may be guided such that the image sensor 15 can be provided on the base end side rather than the distal end section 11.

The image processing device 3 is a video processor that performs prescribed image processing to the received imaging signals to generate the captured image. Video signals of the generated captured images are output from the image processing device 3 to the monitor 6, and the live captured images are displayed on the monitor 6. A physician performing the inspection can insert the distal end section 11 of the insertion section 2b through the anus of the patient Pa and observe the inside of the large intestine of the patient Pa.

The magnetic sensor 16 is disposed in the distal end section 11 of the insertion section 2b. Specifically, the magnetic sensor 16 is a detection device disposed in the vicinity of the image sensor 15 of the distal end section 11 to detect the position and orientation of the point-of-view of the image sensor 15. The magnetic sensor 16 has two coils 16a and 16b. For example, the two central axes of the two cylindrical coils 16a and 16b are orthogonal to each other. Thus, the magnetic sensor 16 is a 6-axis sensor that detects the position coordinates and the orientation of the distal end section 11. The orientation herein refers to the Euler angle. A signal line 2e of the magnetic sensor 16 extends from the endoscope 2 and is connected to the lumen structure detection device 5.

The magnetic field generating device 7 generates a predetermined magnetic field, and the magnetic sensor 16 detects the magnetic field generated by the magnetic field generating device 7. The magnetic field generating device 7 is connected to the lumen structure detection device 5 by a signal line 7a. The magnetic field detection signal is supplied from the endoscope 2 to the lumen structure detection device 5 via the signal line 2e. Instead of the magnetic sensor 16, a magnetic field generating element may be provided in the distal end section 11, and instead of the magnetic field generating device 7, a magnetic sensor may be provided outside the patient Pa to detect the position and orientation of the distal end section 11. Herein, the magnetic sensor 16 detects in real time the position and orientation of the distal end section 11, in other words, the position and orientation of the point-of-view of the captured image acquired by the image sensor 15.

The light source device 4 is a light source device capable of emitting normal light for a normal light observation mode. When the endoscope system 1 has a special light observation mode in addition to the normal light observation mode, the light source device 4 selectively emits normal light for the normal light observation mode and special light for the special light observation mode. The light source device 4 emits either the normal light or the special light as the illumination light depending on the state of a changeover switch for switching the observation mode provided in the image processing device 3.

Figure 3:
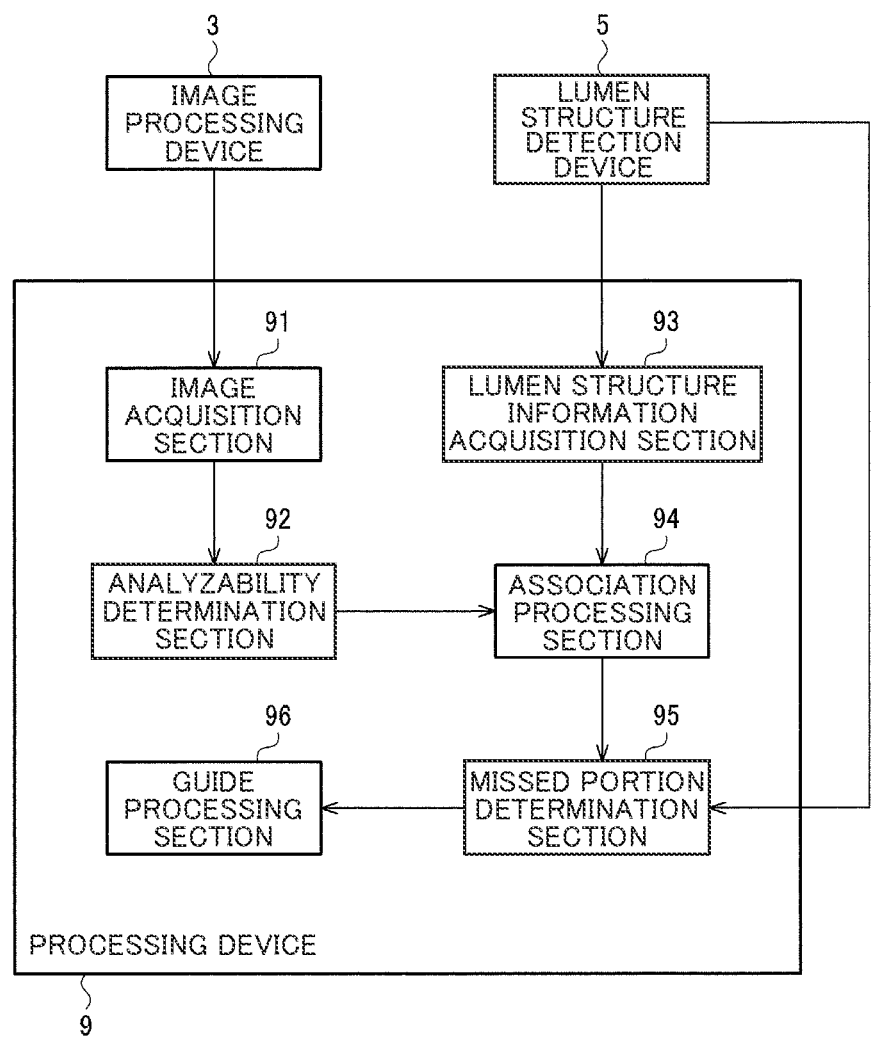
FIG. 3 illustrates an example configuration of a processing device.
Figure 15:
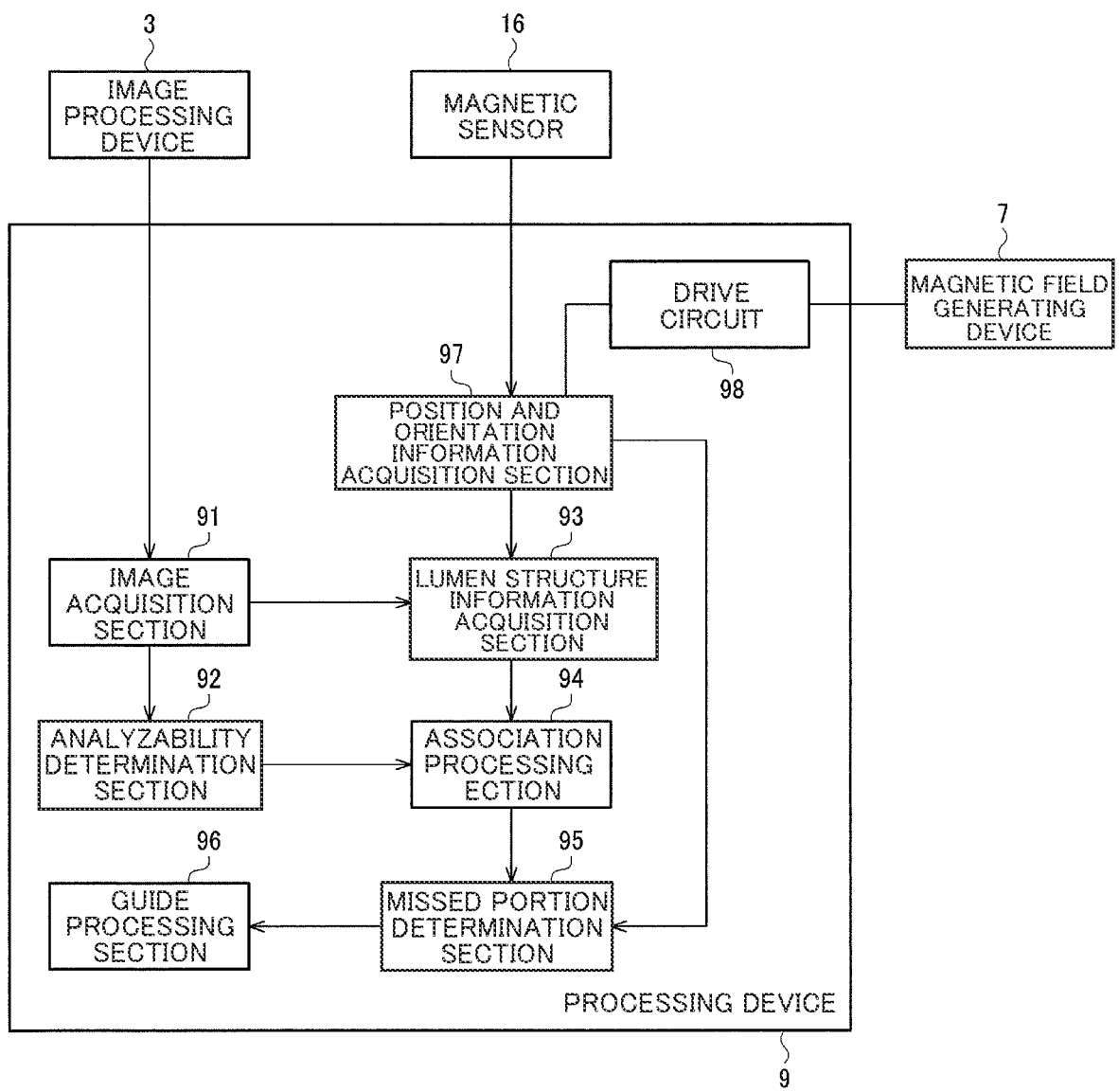
FIG. 15 illustrates another example configuration of the processing device.

FIG. 3 illustrates an example configuration of the processing device 9. The processing device 9 includes an image acquisition section 91, an analyzability determination section 92, a lumen structure information acquisition section 93, and an association processing section 94. Further, the processing device 9 may include a missed portion determination section 95 and a guide processing section 96. However, the processing device 9 is not limited to the configuration illustrated in FIG. 3. For example, as shown in FIG. 15, other components may be added, or some components may be omitted. For example, the missed portion determination section 95 and the guide processing section 96 are not essential and can be omitted.

The image acquisition section 91 acquires the captured images from the image processing device 3. The image processing device 3 can supply the captured images every 1/30 second, for example. The image acquisition section 91 outputs some or all of the captured images to the analyzability determination section 92, etc. The processing by the processing section 9 is not limited to the ones performed in parallel with observation. For example, the image processing device 3 performs a process of storing the captured images in given storage. The image acquisition section 91 may perform a process of reading out the captured images from the storage after the end of observation using the endoscope system 1.

The analyzability determination section 92 performs a process of acquiring the analysis allowability/non-allowability information based on the captured image. Specific processing details are described later. The analysis allowability/non-allowability information is, for example, information that identifies an analyzable region and an unanalyzable region in the captured image, the analyzable region being determined to be analyzable and the unanalyzable region being determined to be unanalyzable. However, the analyzability determination section 92 may determine whether the entire captured image can be analyzed or not. Various modifications can be made in the form of the analysis allowability/non-allowability information.

The lumen structure information acquisition section 93 acquires the lumen structure information indicating the structure of the lumen to be observed. For example, the lumen structure information acquisition section 93 acquires the lumen structure information detected by the lumen structure detection device 5 provided outside the processing device 9, as illustrated in FIG. 3. However, as described later with reference to FIG. 15, the lumen structure information acquisition section 93 may perform a process of detecting the lumen structure information based on the captured image or the like.

The association processing section 94 performs a process of associating the analysis allowability/non-allowability information with the lumen structure. For example, the association processing section 94 performs a process of identifying an analyzable portion and an unanalyzable portion of the lumen structure.

The missed portion determination section 95 detects a region which is highly likely to be missed eventually in the unanalyzable portion. Further, the missed portion determination section 95 may perform a process presenting the detected missed portion. The details of the missed portion are described later.

The guide processing section 96 guides a user based on the analysis allowability/non-allowability information, the result of associating the analysis allowability/non-allowability information with the lumen structure information, or the detection result of the missed portion. Guiding herein is the presentation of information to prompt a given operation. Specific guiding is described later.

Each section of the processing device 9 includes the following hardware. Specifically, each section of the processing device 9 is the image acquisition section 91, the analyzability determination section 92, the lumen structure information acquisition section 93, and the association processing section 94. Further, each section of the processing device 9 may include the missed portion determination section 95 and the guide processing section 96, or may include a position and orientation information acquisition section 97 described later with reference to FIG. 15. The hardware can include at least one of the circuits processing digital signals or the circuits processing analog signals. For example, the hardware can include one or more circuit devices or one or more circuit elements mounted on a circuit board. The one or more circuit devices are, for example, an integrated circuit (IC), or a field-programmable gate array (FPGA). The one or more circuit elements are, for example, a resistor, or a capacitor.

Each section of the processing device 9 may be implemented by a processor as described below. The processing device 9 includes a memory that stores information and a processor that operates based on the information stored in the memory. The information is, for example, a program and various data. The processor includes hardware. The processor can include various processors such as a central processing unit (CPU), a graphics processing unit (GPU), and a digital signal processor (DSP). The memory may be a semiconductor memory such as a static random access memory (SRAM) and a dynamic random access memory (DRAM), a resistor, a magnetic storage device such as a hard disk drive (HDD), or an optical storage device such as an optical memory device. For example, the memory stores computer-readable instructions and the processor executes the instructions to cause the functions of each section of the processing device 9 as processing to be implemented. The instructions herein may be a set of instructions that constitutes a program, or instructions that instruct the hardware circuit of the processor to operate. Furthermore, all or some of each section of the processing device 9 can be implemented by cloud computing, and each of the processes described below can be performed on the cloud computing.

Further, each section of the processing device 9 may be implemented as a module of a program that runs on the processor. For example, the image acquisition section 91 is implemented as an image acquisition module. The analyzability determination section 92 is implemented as a processing module that performs an analyzability determination process. The lumen structure information acquisition section 93 is implemented as an acquisition module or a calculation module of the lumen structure information. The association processing section 94 is implemented as a processing module that performs a process of associating the analysis allowability/non-allowability information with the lumen structure information.

Yet further, the programs for implementing the processes performed by each section of the processing device 9 in the present embodiment can be stored in an information storage device, that is a computer-readable medium, for example. The information storage device can be implemented by, for example, an optical disk, a memory card, HDD, or a semiconductor memory. The semiconductor memory is, for example, ROM. The processing device 9 performs various processing in the present embodiment based on the programs stored in the information storage device. That is, the information storage device stores the programs that make the computer function as each section of the processing device 9. The computer is a device equipped with an input device, a processing section, a storage section, and an output section. Specifically, the program according to the present embodiment is a program for making the computer perform respective steps described later with reference to FIG. 10, etc.

As described above, the processing device 9 of the present embodiment includes the image acquisition section 91 that acquires a captured image of the inside of the lumen, the lumen structure information acquisition section 93 that acquires the lumen structure information indicating the structure of the lumen, the analyzability determination section 92 that outputs the analysis allowability/non-allowability information indicating whether the captured image is in an analysis allowable state or not based on the captured image, and the association processing section 94 that associates the analysis allowability/non-allowability information with the structure of the lumen based on the analysis allowability/non-allowability information and the lumen structure information. For example, the captured image is acquired by imaging the inside of the lumen by the imaging section. Specifically, the imaging section corresponds to the image sensor 15. The captured image may also be the output itself of the image sensor 15, or may be a result from processing on the output. For example, the captured image may be information after processing by the image processing device 3. The analyzability determination section 92 determines, specifically for each region of the captured image, whether the subject imaged in the region is in an analysis allowable state or not.

The method of the present embodiment allows association of the structure of the lumen with whether or not the lumen has been imaged in a state enabling desired analysis, such as lesion detection and malignancy determination. Thereby, it is possible to appropriately determine which region of the lumen structure is likely to be missed. For example, by presenting the association result to the user during observation, it is possible to reduce missing. Alternatively, the association result may be used to evaluate user skills. Further, based on the association result, insertion/withdrawal of the insertion section 2b or control of the curving section 12 may be performed.

The method of the present embodiment can be applied to the endoscope system 1 comprising the imaging section that images the inside of the lumen, the image acquisition section 91 that acquires a captured image imaged by the imaging section, the lumen structure information acquisition section 93 that acquires the lumen structure information indicating the structure of the lumen, the analyzability determination section 92 that outputs the analysis allowability/non-allowability information indicating whether the captured image is in an analysis allowable state or not based on the captured image, and the association processing section 94 that associates the analysis allowability/non-allowability information with the structure of the lumen based on the analysis allowability/non-allowability information and the lumen structure information.

Further, the processes performed by the processing device 9 of the present embodiment may be realized as a method for processing a captured image. The method for processing a captured image according to the present embodiment comprises: acquiring a captured image of the inside of the lumen; acquiring the lumen structure information indicating the structure of the lumen; outputting the analysis allowability/non-allowability information indicating whether the captured image is in an analysis allowable state or not based on the captured image; and associating the analysis allowability/non-allowability information with the structure of the lumen based on the analysis allowability/non-allowability information and the lumen structure information.

2. Details of Processes

Provided below is a detailed description of each process performed in the system comprising the processing device 9 of the present embodiment. An example is described below, in which acquisition of the lumen structure information based on a captured image, acquisition of the analysis allowability/non-allowability information, and association of the lumen structure information with the analysis allowability/non-allowability information are performed during observation. However, as described later as modifications, the timing of performing each process is not limited thereto.

2.1 Acquisition Process of Lumen Structure Information

First, processes executed by the lumen structure detection device 5 are described. As described later with reference to FIG. 15, a process of detecting the lumen structure may be performed by the processing device 9.

2.1.1 Example Configuration of Lumen Structure Detection Device

Figure 4:
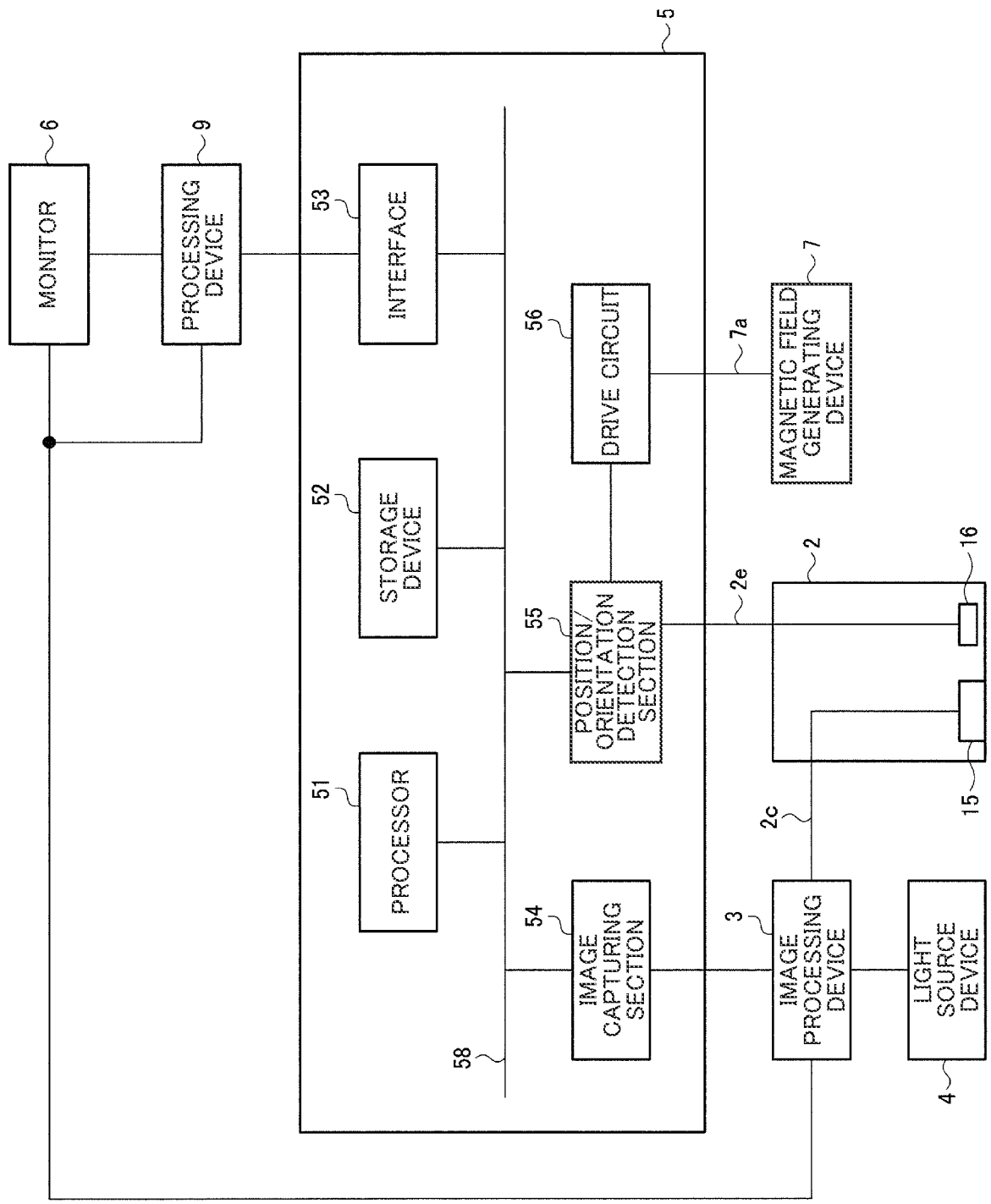
FIG. 4 illustrates an example configuration of a lumen structure detection device.

FIG. 4 illustrates an example configuration of the lumen structure detection device 5. The lumen structure detection device 5 includes a processor 51, a storage device 52, an interface 53, an image capturing section 54, a position/orientation detection section 55, and a drive circuit 56. Each section of the lumen structure detection device 5 is connected to each other by a bus 58.

The processor 51 is a control section having a CPU and a memory. The processor 51 controls processing of each section of the lumen structure detection device 5. The memory is a storage section including ROM, RAM, and the like. The ROM stores various processing programs to be executed by the CPU, as well as various types of data. The CPU can read out and execute various programs stored in the ROM and the storage device 52.

The storage device 52 stores a lumen structure calculation program. The lumen structure calculation program is a software program that calculates the lumen structure information from the information of position and orientation of the distal end section 11 and the captured images. When the CPU reads out and executes the lumen structure calculation program, the processor 51 constitutes a lumen structure calculation section that calculates the three-dimensional structure of the lumen based on the captured image obtained by the image sensor 15 and the three-dimensional arrangement of the distal end section 11 detected by the magnetic sensor 16.

The interface 53 outputs the lumen structure information calculated by the processor 51 to the processing device 9. The interface 53 is, for example, a communication interface that communicates with the processing device 9.

The image capturing section 54 is a processing section that captures a captured image obtained in the image processing device 3 at a certain period. For example, thirty captured images per second, which is equal to the frame rate, are acquired from the image processing device 3 through the endoscope 2. Although the image capturing section 54 herein captures the thirty images per second, it is also possible to acquire the captured images at a period longer than the frame rate. For example, the image capturing section 54 may capture, for example, three captured images per second.

The position/orientation detection section 55 controls the drive circuit 56 that drives the magnetic field generating device 7 such that the magnetic field generating device 7 generates a predetermined magnetic field. The position/orientation detection section 55 detects the magnetic field with the magnetic sensor 16 and generates data of the position coordinates (x, y, z) and the orientation (vx, vy, vz) of the image sensor 15 from the detected magnetic field detection signal. The orientation refers to the Euler angle. That is, the position/orientation detection section 55 is a detection device that detects the position and orientation of the image sensor 15 based on the detection signal from the magnetic sensor 16.

2.1.2 Processing Flow

Figure 5:
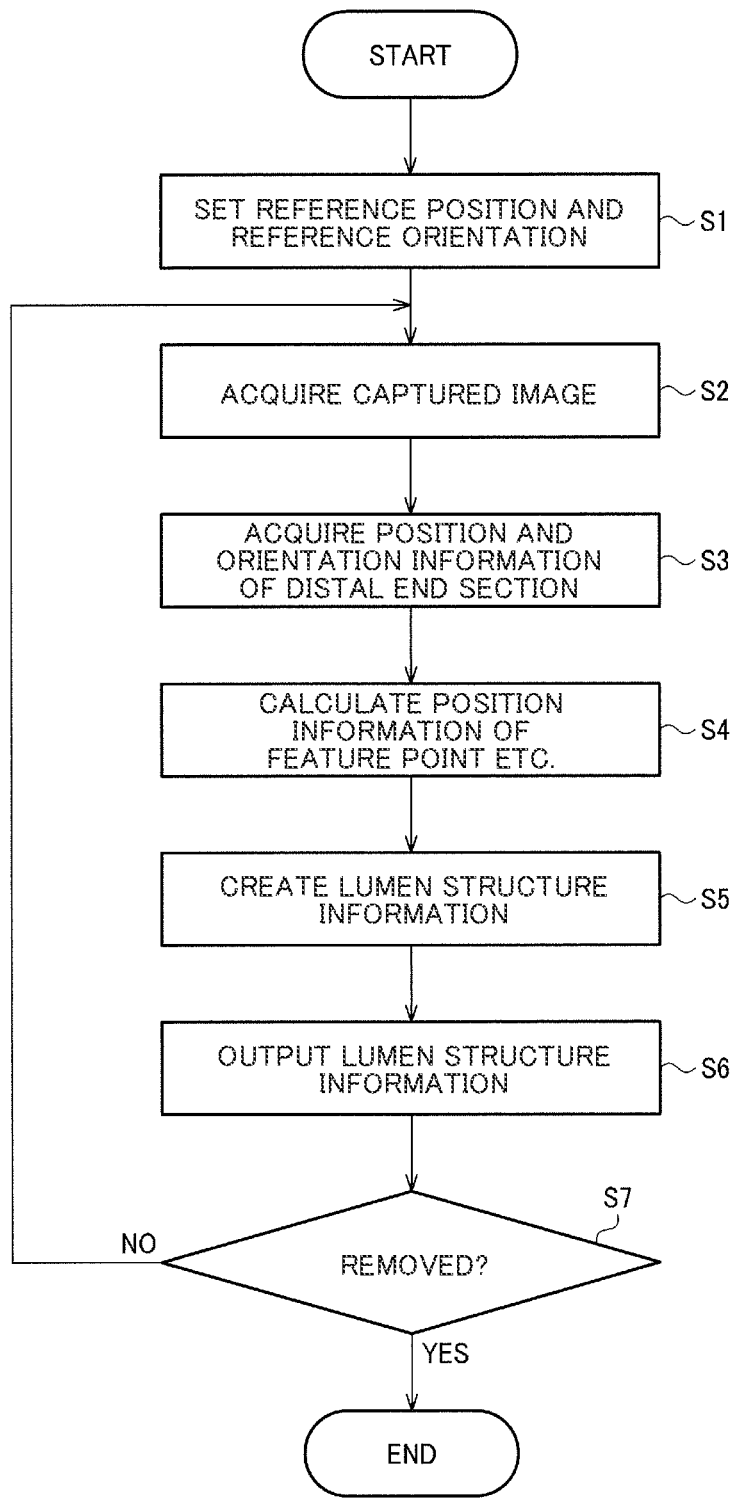
FIG. 5 is a flowchart illustrating a process of acquiring lumen structure information.

FIG. 5 is a flowchart of an example of a flow of the lumen structure calculation process. First, a physician performs a predetermined operation on an input device (not illustrated) with the distal end section 11 of the insertion section 2b positioned in the anus. Based on the operation, the processor 51 sets position and orientation data from the position/orientation detection section 55 as a reference position and a reference orientation of the distal end section 11 when calculating the lumen structure (S1). For example, with the distal end section 11 placed on the anus, the physician sets the reference position and the reference orientation of the distal end section 11 in the position of the anus in the three-dimensional space as an initial value. The lumen structure calculated in the following process is calculated based on the reference position and the reference orientation set herein.

After setting the reference position and the reference orientation, the physician inserts the distal end section 11 to the innermost part of the large intestine. With the distal end section 11 of the insertion section 2b at the innermost part of the large intestine, the physician sends air to expand the large intestine and moves the insertion section 2b toward the anus by pulling it, and curves the curving section 12 in various directions to observe the inner wall of the large intestine while stopping pulling the insertion section 2b on the way. The lumen structure of the large intestine is calculated while the physician is observing the inner wall of the large intestine.

The image capturing section 54 acquires the captured image at every predetermined period Δt from the captured images supplied every 1/30 second from the image processing device 3 (S2). For example, the period Δt is 0.5 seconds. The CPU acquires information of the position and orientation of the distal end section 11 output by the position/orientation detection section 55 upon the acquisition of the captured image (S3).

The processor 51 calculates the position information of a plurality of feature points, etc. in the three-dimensional space, in a captured image acquired in S2 and one or more previously acquired captured images (S4). The set of the position information of a plurality of feature points, etc. determined by the calculation corresponds to the information of the lumen structure. As described below, the position information of each feature point may be calculated from the image information using a method such as Simultaneous Localization and Mapping (SLAM) and Structure from Motion (SfM) or using triangulation principles. The method for calculating the position of each feature point is described later.

When a first captured image is acquired, since there are no previously acquired captured images, the step S4 is not performed until a predetermined number of captured images are acquired.

The processor 51 creates or updates the lumen structure information by adding the calculated position information of a plurality of feature points, etc. (S5).

Figure 6:
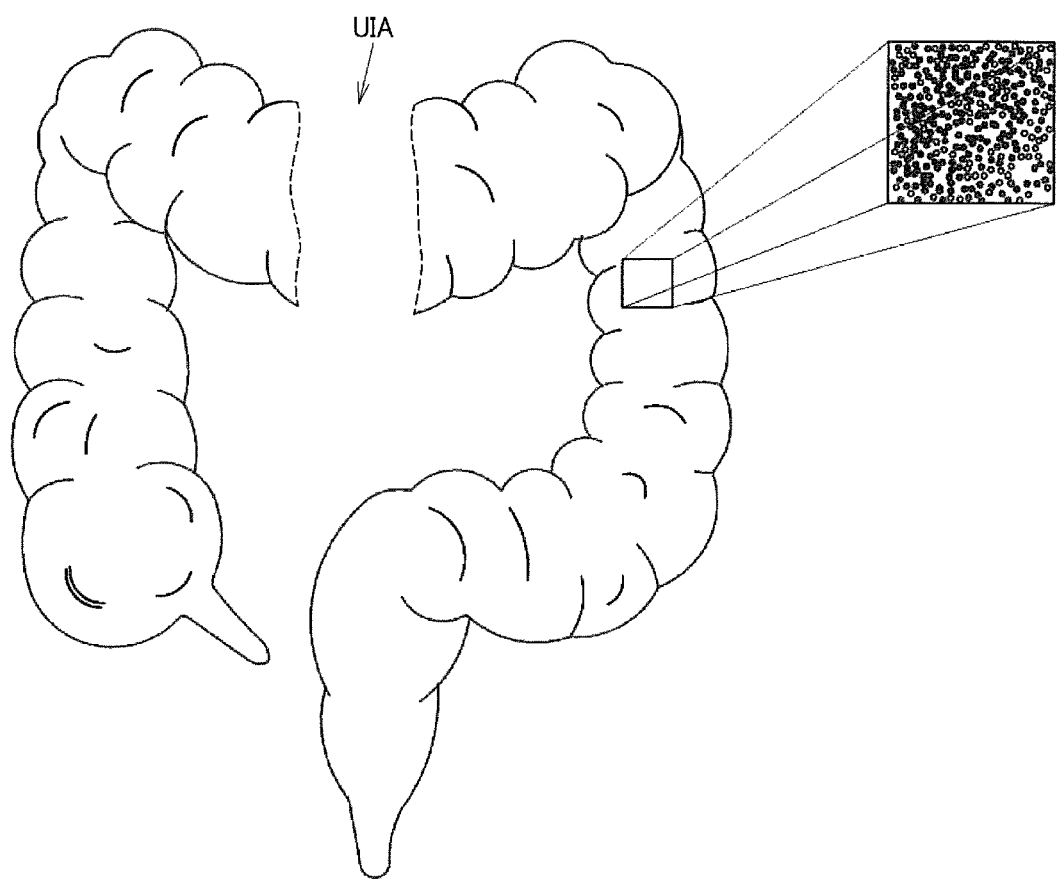
FIG. 6 illustrates an example of the lumen structure information.

FIG. 6 illustrates an example of the lumen structure information. The lumen structure information created in S5 is constituted of a set of one or more feature points, etc. in the region observed by the endoscope 2. The lumen structure information is 3D data. FIG. 6 is an image of the lumen structure information viewed from a given point-of-view. For example, when the lumen structure information is displayed, the user can input instructions to change the point-of-view position, thereby can confirm the structure of the lumen viewed from a desired angle in the range of 360 degrees.

Further, FIG. 6 illustrates an example of the lumen structure information that even takes into account the unevenness in the lumen. However, the lumen structure information may be more simplified information. For example, the lumen structure information may be a cylinder model. Assuming that the lumen is a cylindrical shape, a processing load can be reduced. For example, as described later, in an embodiment in which a sensor, such as the magnetic sensor 16, is not used, the effect of reducing the calculation amount by assuming a cylindrical lumen is significant. For simplification, it is also possible to assume a straight lumen with no bends or only simple bends, or a structural model with differences only in size, such as length and the diameter for each part, from a standard lumen structure.

The interface 53 of the lumen structure detection device 5 outputs the created lumen structure information to the processing device 9 (S6). In S6, the interface 53 may also control the display of the lumen structure information on the monitor 6. Then, the processor 51 determines whether the insertion section 2b has been removed from the patient or not (S7). For example, when the insertion section 2b has been removed, the user performs user input indicating the end of observation using an input device (not illustrated). The processor 51 performs determination as shown in S7 based on the user input. If the removal has not been done (No in S7), the process returns to S2.

There are various methods for calculating the position of the feature points, etc. in S4. Several methods are described below. The processor 51 may use SLAM, SfM, or the like to calculate the positions of the feature points on a plurality of consecutive images.

In generation of the lumen structure information, it is possible to apply a bundle adjustment that optimizes internal parameters, external parameters, and a world coordinate point group from images using a nonlinear least squares method. For example, using each of the presumed parameters, the world coordinate points of a plurality of feature points thus extracted are subjected to perspective projection transformation, thereby obtaining each parameter and each world coordinate point group with minimum reprojection errors.

The external parameters for the distal end section 11 are calculated by solving the 5-point and 8-point algorithms. The position of the feature point is calculated according to the position of the distal end section 11 using the triangulation method. The error E between the coordinates of the 3D point projected on the image plane and the feature point resulting from the reprojection error is expressed by the following equation (1).

[Math. 1]

$$E = \sum_{i=1}^{K} \sum_{j=1}^{L} \|P_i - P_{sj}\|^2 \quad (1)$$

In the equation (1), L is the number of the feature points on K images, Psj is the coordinate position of the 3D point Pi presumed by the parameter of the distal end section 11 with triangulation on the image plane, and Pi is the coordinate position of the corresponding feature point on the image. The position coordinates of the distal end section 11 are calculated using a Levenberg-Marquartdt (LM) method so that the function of the error E in the equation (1) is minimized.

Figure 7:
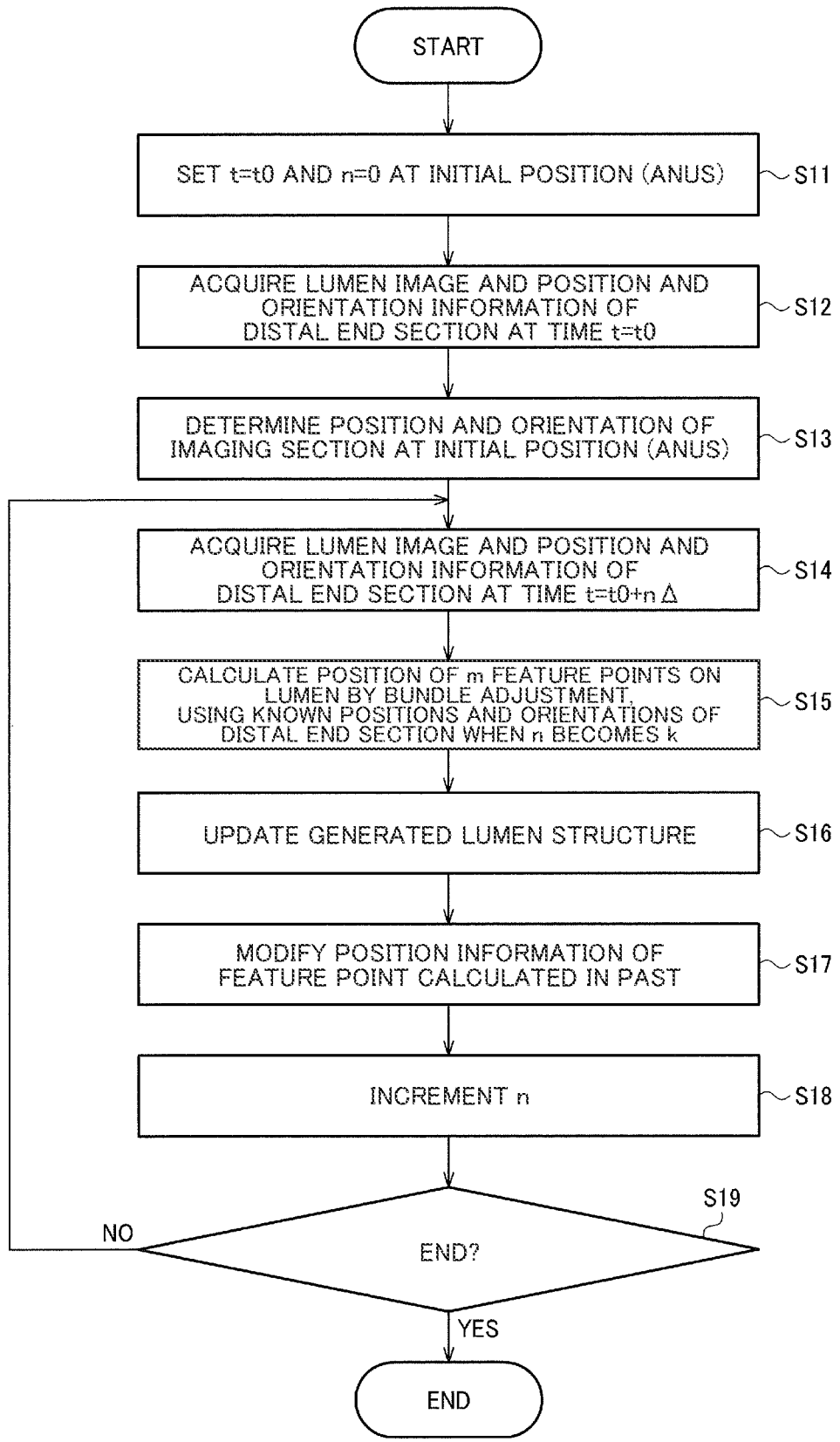
FIG. 7 is a flowchart illustrating a process of acquiring the lumen structure information using a bundle adjustment.

FIG. 7 is a flowchart of a method of performing calculation of the position of each feature point in the three-dimensional space using a bundle adjustment. When the anal position is set to the initial position, the processor 51 sets the time t to t0 and a software counter value n to 0 (S11).

The processor 51 acquires a captured image at time t0 and the information of position and orientation of the distal end section 11 (S12). The captured image is acquired from the image processing device 3. The information of position and orientation of the distal end section 11 is acquired from the position/orientation detection section 55.

The processor 51 determines the position and orientation of the distal end section 11 at the initial position, i.e., the anal position (S13). For example, the anal position (x, y, z) and the orientation (vx, vy, vz) are determined to be (0, 0, 0) and (0, 1, 0), respectively. S11 and S13 correspond to S1 in FIG. 5.

The processor 51 acquires a captured image at the time (t0+nΔt) and the information of position and orientation of the distal end section 11 (S14). S12 and S14 correspond to S2 in FIG. 5. The information of position and orientation of the distal end section 11 may be modified. For example, using a Kalman filter, the path on which the distal end section 11 passes in the past is modified, and the past position of the distal end section 11 is modified based on the modified path.

When n becomes k, the processor 51 extracts a plurality of feature points in each captured image, and calculates the positions of m feature points in the acquired captured image by the bundle adjustment described above using the known positions and orientations of the distal end section 11, i.e., the known three-dimensional arrangements of the distal end section 11, when n becomes k (S15).

Figure 8:
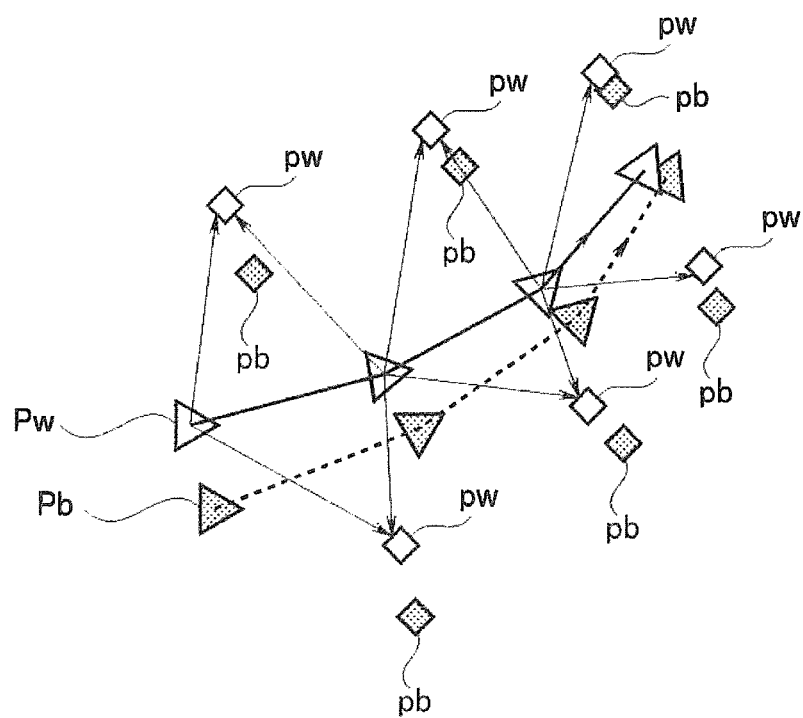
FIG. 8 is a schematic diagram illustrating relationship between a plurality of feature points and a position and orientation of a distal end section.

FIG. 8 is a schematic diagram illustrating the relationship between feature points on a plurality of consecutively acquired captured images and the position and orientation of the distal end section 11. In FIG. 8, a white triangle Pw represents the actual position and orientation of the distal end section 11, and a black triangle Pb represents the presumed position and orientation of the distal end section 11. It shows that the distal end section 11 actually moved along the solid line. The presumed distal end section 11 moves along the dotted line. The position of the distal end section 11 moved and the orientation thereof changed over time.

Further, in FIG. 8, the white rectangle pw represents the actual position of the feature point, and the black rectangle pb represents the presumed position, i.e. the calculated position of the feature point. The feature point is, for example, a part of the captured image with a characteristic shape or color and thus is easy to identify or track.

To acquire the three-dimensional lumen structure of the large intestine, the coordinates of a plurality of feature points on the inner wall of the intestinal tract of the large intestine are determined, and a three-dimensional model is generated by the set of a plurality of coordinates thus determined or by connecting the coordinates. That is, the three-dimensional structure of the lumen is determined from the calculated position of each feature point in the three-dimensional space.

In FIG. 8, the information of the position and orientation of the distal end section 11 at each time point includes information for 6 axes, and thus the information of the position and orientation of the distal end section 11 when n becomes k contains 6 k pieces of information. Since the position of each feature point contains information for 3 axes, the position information of m feature points contains 3m pieces of information. Therefore, when using a method such as SLAM and SfM, the number of parameters to be determined is (6k+3m).

In the method of the present embodiment, as described above, the magnetic sensor 16 is provided in the distal end section 11 of the endoscope 2, and the lumen structure detection device 5 may include the position/orientation detection section 55 that acquires the position and orientation information detected by the magnetic sensor 16. In this case, the 6 k parameters corresponding to the positions and orientations of the distal end section 11 are known parameters. Since the optimization calculation by the processor 51 is limited to the calculation of 3m parameters, it is possible to reduce the processing amount of the optimization calculation. Therefore, it is possible to accelerate the processing. Additionally, the reduced number of parameters suppresses the accumulation of detection errors, thereby preventing an increase in error in the position of the generated three-dimensional model.

Further, even if the distal end section 11 of the insertion section 2b of the endoscope 2 is pressed against the inner wall of the lumen, or immersed in dirty cleaning water, or even if consecutive images cannot be properly captured due to blurred images or the like, the information of the position and orientation of the distal end section 11 can be acquired. Thus, even if consecutive images were not successfully obtained in some cases, the calculation of the 3m parameters is likely to succeed. As a result, the robustness of the calculation of the lumen structure increases.

The explanation continues below with reference back to FIG. 7. The processor 51 updates the lumen structure information by adding the newly calculated position information of the feature point to the already created lumen structure information (S16). S16 corresponds to S5 in FIG. 5.

The processor 51 modifies the position information of the feature point that was calculated in the past (S17). Among the 3m feature points obtained by the new calculation, the position information of the feature point calculated in the past is modified using the newly calculated position information, for example, by average value calculation. The process in S17 may not be performed; instead, the position information of each feature point calculated in the past may be updated by the newly calculated position information of the feature point.

After S17, the processor 51 increments n by 1 (S18) and determines whether a command to end the inspection has been entered or not (S19). The command to end the inspection is, for example, a predetermined command that is entered to the input device by the physician after the insertion section 2b has been removed from the large intestine. When the command is entered (YES in S19), the process ends.

If the command to end the inspection is not entered (NO in S19), the process goes to S14. As a result, the processor 51 acquires a captured image after the period Δt from the last acquisition time of the captured image (S14) and executes the process in S14 onward.

By performing the above processes, the lumen structure information is output. The lumen in the present embodiment is assumed to be a continuous curved surface with no holes or the like except at the ends. Therefore, the distance between a given feature point and its neighboring feature point is expected to be somewhat small in the lumen structure information to be acquired. If there is a portion with coarse feature points, for example, a portion where the feature points are no greater than a predetermined threshold level over a certain wide area, the portion can be determined to be an unanalyzable portion. More specifically, the portion is determined to be the third unanalyzable portion described above, among the unanalyzable portions. During the observation of the large intestine, the insertion section 2b is first inserted into the depth, and then pulled out while generating the lumen structure information. Therefore, the portion closer to the anal side than the portion currently under observation is basically determined to be the third unanalyzable portion.

Further, the unanalyzable portion herein corresponds to the UTA in FIG. 6, for example. FIG. 6 illustrates an example where the lumen structure information is divided into two parts due to the presence of the unanalyzable portion. If the configuration includes a sensor for detecting the position and orientation of the distal end section 11 of the insertion section 2b, even when the lumen structure information is divided as described above, it is possible to identify the positional relationship of a plurality of pieces of divided lumen structure information. In other words, it is possible to presume the entire lumen structure even when the lumen structure information is divided.

Further, the hidden portion that is in the field of view but not imaged due to the uneven structure of the lumen, such as a back side of a fold, is also determined to be an unanalyzable portion due to its coarse feature points. However, the hidden portion is in the field of view of the imaging section, and thus it corresponds to the second unanalyzable portion described above, among the unanalyzable portions. Therefore, when the second and third unanalyzable portions are distinguished from each other in the processes, the processing device 9 may determine whether the portion is the hidden portion or not based on, for example, the size of the portion with coarse feature points or the shape of the surrounding portion. Alternatively, the processing device 9 may detect the presence or absence of the hidden portion based on the image processing of the captured image. Details of the image processing are described later with reference to FIG. 11.

2.1.3 Modifications in Acquisition of Lumen Structure Information

<Modifications of Sensor>

In the above, the magnetic sensor 16 is used as a position sensor for detecting the position and orientation of the distal end section 11 of the insertion section 2b. However, other means may be used to detect the position and orientation of the distal end section 11.

Figure 9A:
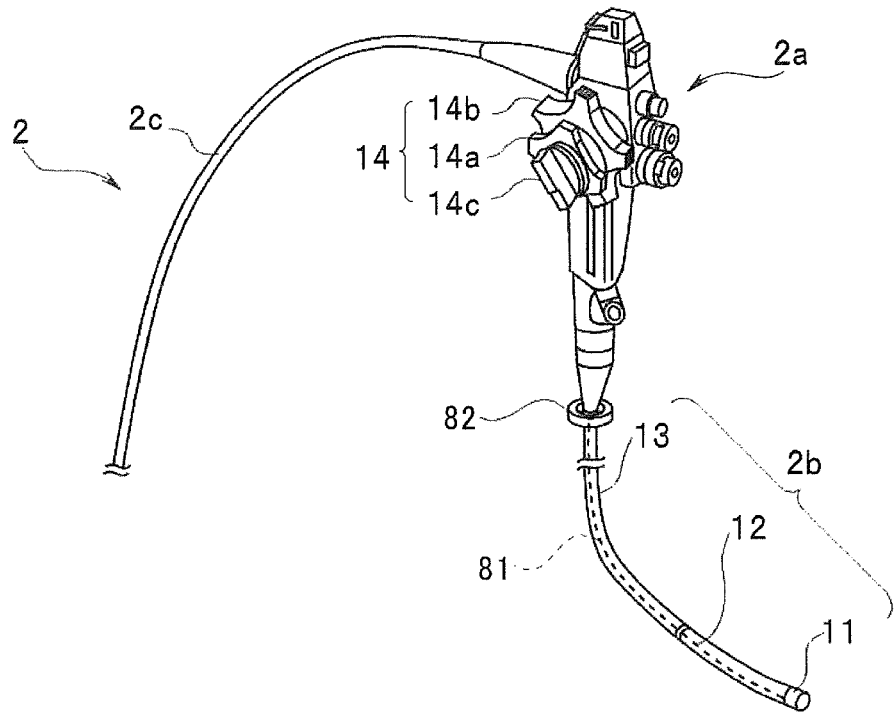
FIGS. 9A and 9B illustrate modified examples of a position/orientation detection sensor.

FIG. 9A illustrates the endoscope 2 having a shape sensor 81, and a method for detecting the position and orientation of the distal end section 11 using a sensor for detecting the amount of insertion and torsion. The shape sensor 81 is arranged inside the insertion section 2b from the base end to the leading end. For example, the shape sensor 81 is a fiber sensor, that is a curve sensor using an optical fiber to detect the curving amount based on the curvature of a specific portion.

An insertion/torsion amount sensor 82 is arranged near the anus and has a cylindrical shape with a hole through which the insertion section 2b can be inserted. An encoder for detecting the axial insertion amount of the insertion section 2b and an encoder for detecting the axial rotation amount of the insertion section 2b are installed on the inner circumferential surface of the hole of the insertion/torsion amount sensor 82. Accordingly, by using the shape sensor 81 and the insertion/torsion amount sensor 82, it is possible to presume the position and orientation of the distal end section 11 based on the insertion and torsion amount of the insertion section 2b, with respect to the anus as a reference position.

Figure 9B:
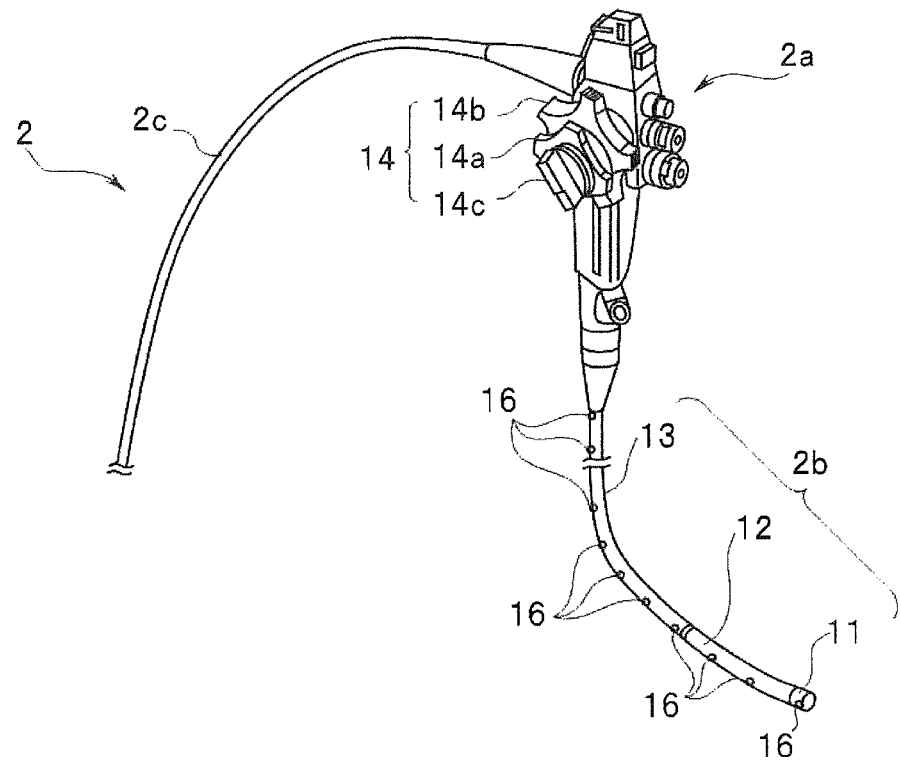

Alternative to the one using an optical fiber, the shape sensor 81 may be configured with one magnetic sensor 16 in the distal end section 11 and a plurality of magnetic sensors 16 arranged inside the insertion section 2b at predetermined intervals to detect the shape of the insertion section 2b. FIG. 9B is a perspective diagram of the endoscope 2 with a plurality of magnetic sensors 16 arranged inside the insertion section 2b. The shape of the insertion section 2b can be calculated from the position information of a plurality of magnetic sensors 16 as shown in FIG. 9B.

Further, a modified embodiment, wherein the magnetic sensor 16 is provided in the distal end section 11 and the shape sensor 81 shown in FIG. 9A is installed inside the insertion section 2b, can be made. This makes it possible to grasp the overall shape of the insertion section 2b in addition to the position and orientation of the distal end section 11.

<Modifications in Calculation of Feature Point Position>

Described above is the bundle adjustment to optimize 3m parameters using all the known (x, y, z, vx, vy, vz), that is the position and orientation of the distal end of the insertion section. However, the processor 51 may be configured to calculate the three-dimensional position of each feature point using optimization by the bundle adjustment and some of the known (x, y, z, vx, vy, vz). In this case, the calculation accuracy of the three-dimensional position of each feature point is higher and the time of optimization calculation is shorter than a case optimizing all 6k+3m parameters.

Further, if the position and orientation can be detected using a sensor, the process of acquiring the lumen structure information is not limited to the bundle adjustment. For example, the processor 51 may use triangulation to acquire the lumen structure information from two images. Specifically, the processor 51 uses triangulation to calculate the positions of the feature points from the information of the position and orientation of the distal end section 11 and two captured images. That is, the three-dimensional structure of the lumen is determined from the information of the position and orientation of the image sensor 15 and the position information of pixels in the three-dimensional space calculated using triangulation from the position information of pixels of the feature points included in two captured images obtained by the image sensor 15.

Further, triangulation may be performed based on two captured images acquired at two different times, or based on two captured images acquired at the same time by using a stereo camera.

Further, the processor 51 may calculate the position of each feature point using photometric stereo images. In this case, a plurality of lighting windows is provided in the distal end section 11 of the insertion section 2b. A plurality of illumination lights emitted from a plurality of lighting windows can be switched and selectively emitted by drive control of a plurality of light-emitting diodes for illumination provided in the light source device 4.

A shadow portion in the image of the surface of the subject changes its state by switching of the illumination light. Therefore, the distance to the shadow portion on the surface of the subject can be calculated based on the amount of change. In other words, the three-dimensional structure of the lumen can be determined based on the photometric stereo from the image of the shadow region in the captured image acquired by illumination with a plurality of illumination sections that are operated selectively.

Further, the processor 51 may use a distance sensor to calculate the lumen structure. For example, the distance sensor is a sensor that detects a distance image by way of Time Of Flight (TOF). The distance sensor measures the distance by measuring the time of flight of the light. The distance sensor is provided in the distal end section 11 of the insertion section 2b and detects the distance between the distal end section 11 and the inner wall of the lumen for each pixel. It is possible to calculate the position information of each point on the inner wall of the large intestine, i.e., the three-dimensional structure of the lumen, from the distance for each pixel detected by the distance sensor and the position and orientation of the distal end section 11. The distance sensor may be other types of sensors such as Light Detection and Ranging/Laser Imaging Detection and Ranging (LiDAR). Further, the distal end section 11 may be provided with an illumination section that emits a predetermined pattern light, and the processor 51 may measure the distance between the distal end section 11 and the inner wall by pattern light projection.

<Example of Omitting Position/Orientation Detection Sensor>

The configuration using a position/orientation detection sensor, such as the magnetic sensor 16, for calculating the lumen structure information is not indispensable for the method of the present embodiment. Specifically, the magnetic sensor 16 and the magnetic field generating device 7 shown in FIG. 1, or the shape sensor 81 shown in FIG. 9A, or the like can be omitted.

In this case, the processor 51 calculates the lumen structure information based on a plurality of captured images using a method such as SLAM and SfM. For example, in the above example, the processor 51 performs the process of optimizing (6k+3m) parameters including the position and orientation of the distal end section 11.

2.2 Analyzability Determination

Next, a determination process performed by the analyzability determination section 92 is to be described. The analyzability determination section 92 determines whether a subject imaged in a captured image is in an analysis allowable state or not based on the captured image.

Figure 10:
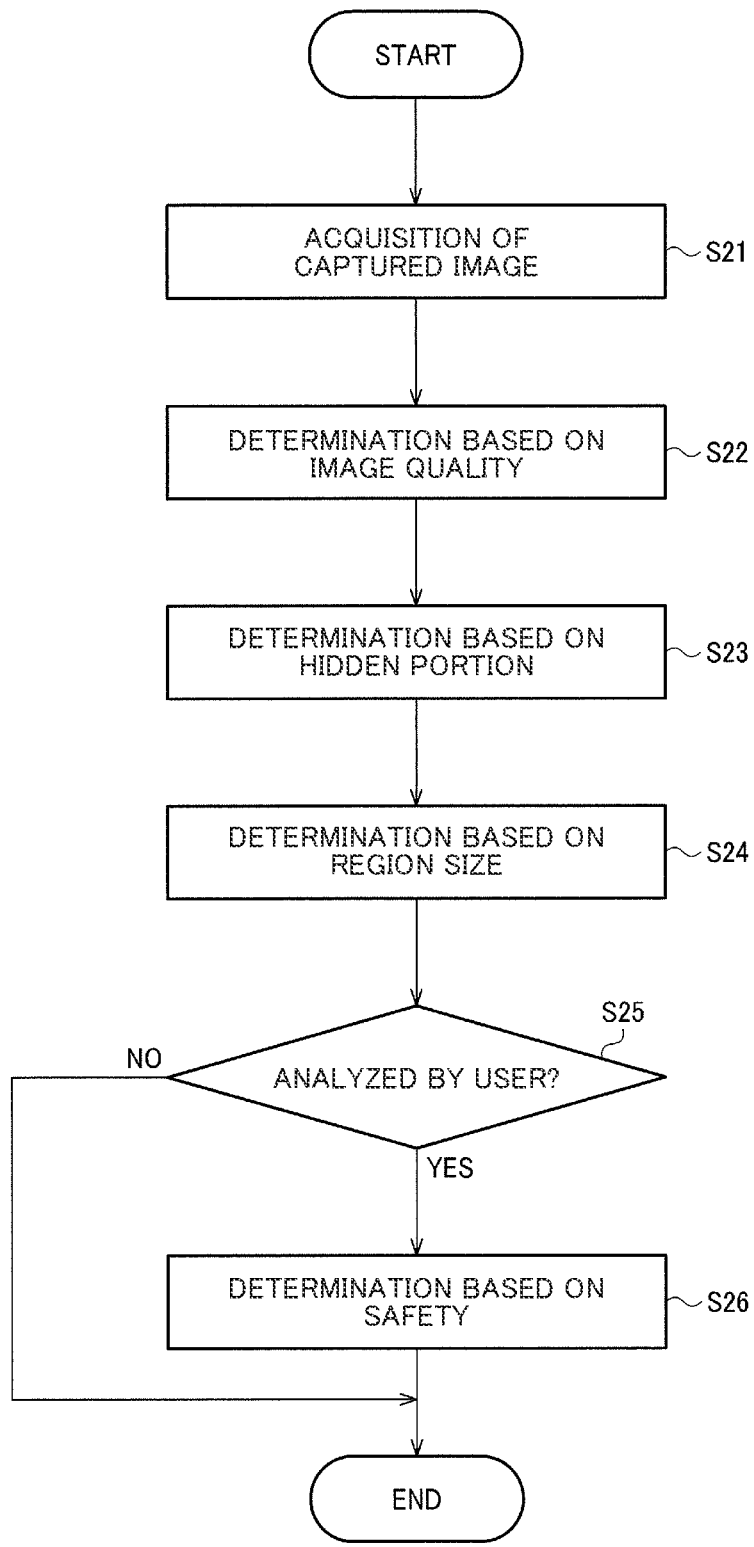
FIG. 10 is a flowchart illustrating an analyzability determination process.

FIG. 10 is a flowchart illustrating the analyzability determination process. When this process is started, the analyzability determination section 92 first acquires a captured image from the image acquisition section 91 (S21). Then, the analyzability determination section 92 determines analyzability based on the image quality of the captured image (S22). Specifically, the image quality herein is information indicating brightness of the captured image, an imaging angle, and a degree of obstruction. The degree of obstruction is, in a narrow sense, the presence or absence of an obstacle.

Specifically, the information indicating brightness is luminance information. The luminance is a weighted sum of three pixel values of RGB, and various weights are applicable. An extremely bright region in the captured image, such as an overexposed region, does not contain specific information of the lumen and is not suitable for analysis. The information of the lumen includes various types of information such as an uneven structure on the luminal surface, a vascular structure on the surface or inside of the lumen, and a color of mucosa. Therefore, the analyzability determination section 92 determines that a region in the captured image with brightness no less than a predetermined value is the unanalyzable region. For example, the analyzability determination section 92 determines that a region with luminance no less than a given first luminance threshold is the unanalyzable region.

Further, an extremely dark region in the captured image, for example, an underexposed region, also does not contain specific information of the lumen and is not suitable for analysis. Therefore, the analyzability determination section 92 determines that a region in the captured image with brightness no greater than a predetermined value is the unanalyzable region. For example, the analyzability determination section 92 determines that a region with brightness no greater than a given second luminance threshold is the unanalyzable region. Herein, the first luminance threshold>the second luminance threshold is held. Other information such as lightness may be used as information indicating brightness.

Note that the analyzability determination section 92 determines that the overexposed or underexposed region is the second unanalyzable region since it is highly probable that the lumen information is lost in such region. The second unanalyzable region is a region on the image capturing the second unanalyzable portion described above. However, depending on the setting of the threshold, the lumen information may remain despite its low visibility. Therefore, the analyzability determination section 92 may determine that the region determined to be the unanalyzable region based on the brightness is the first unanalyzable region. The first unanalyzable region is a region on the image capturing the first unanalyzable portion described above. Further, the analyzability determination section 92 may omit classification of the unanalyzable region.

Furthermore, the analyzability determination section 92 detects an obstacle in the lumen and determines that the region of the luminal surface covered by such obstacle is the unanalyzable region. The obstacle herein includes a residue, dirty water, bubbles, blood, a hemostatic clip, etc. The residue includes stool, undigested food scraps, etc. These obstacles have a different color from that of the luminal surface such as mucosa. Therefore, the analyzability determination section 92 performs a conversion process from RGB pixel values to an HSV color space based on the captured image, for example, and determines that a region in the captured image, whose hue or saturation is within a given range, is the unanalyzable region obstructed by the obstacle. Furthermore, the analyzability determination section 92 may perform a conversion process from the pixel values of RGB to a YCrCb color space and detect the obstacle based on at least one of color difference signals Cr and Cb. Further, when brightness is uneven, the analyzability determination section 92 may perform the above color determination process after performing a filtering process such as shading correction. The shading correction process is, for example, a gamma correction process per region. When the color or shape of the obstacle is known such as a hemostatic clip, the analyzability determination section 92 may perform a process of detecting the obstacle by comparing the sample image of the obstacle with the captured image.

Note that if there is a region covered by the obstacle but an area of the region is sufficiently small, there is a low possibility that the region of interest such as a polyp may exist under the obstacle. Therefore, the analyzability determination section 92 may determine the region covered by the obstacle, which is larger than or equal to a predetermined size, to be the unanalyzable region. The size herein may be a size on the image or an actual size on the lumen. Conversion from the size on the image to the actual size can be executed based on optical characteristic information of lens, an image sensor, or the like, and distance information to the subject. The optical characteristic information is known in design. The distance information may be acquired using the distance sensor described above or calculated based on a stereo image using a stereo camera. Further, the distance information may be acquired using the calculation result of the lumen structure information. As described above, in the process of calculating the lumen structure information, the three-dimensional position of the distal end section 11 and the three-dimensional position of the feature point are presumed, and thus, the distance from the distal end section 11 to a given pixel on the captured image can be determined based on the presumption result. Further, the analyzability determination section 92 may calculate the distance information based on the brightness of the captured image. In this case, it is determined that a bright region is in a close distance and a dark region is far away.

Note that, since the lumen information is lost in the region where the obstacle exists, the analyzability determination section 92 determines the region to be the second unanalyzable region.

Furthermore, the analyzability determination section 92 determines analyzability based on an imaging angle of the subject. The imaging angle herein represents, for example, an angle between a straight line connecting the distal end section 11 and the subject and a normal line direction of the subject surface. For example, when the distal end of the insertion section directly faces the subject, the imaging angle is a small value close to 0°. On the other hand, when an optical axis is in a direction along a longitudinal direction of the lumen, the imaging angle of the lumen wall surface is somewhat larger than 0°. When the imaging angle is large, the subject is imaged from an oblique direction, and thus the size of the subject on the image is very small, resulting in possible loss of information of fine structures or the like.

For example, the analyzability determination section 92 may acquire a result of the calculation process of the lumen structure information to calculate the imaging angle of each subject in the captured image. In this case, the analyzability determination section 92 determines that a region with the imaging angle of no less than a given angle threshold is the unanalyzable region. Alternatively, the analyzability determination section 92 may determine the imaging angle based on the distance information. For example, when the imaging angle is large, the distance to the subject rapidly changes in the narrow range on the image. Hence, the analyzability determination section 92 may determine a degree of change of the distance information in a given region containing pixels to be processed, and in a case that the degree of change is large, may determine that the imaging angle is large. As mentioned above, the distance information can be calculated based on various types of information such as the brightness of the captured image. For example, the analyzability determination section 92 may divide the captured image into a plurality of regions and obtain the imaging angle based on brightness distribution in each region.

Note that the analyzability determination section 92 determines a region with a large imaging angle to be the first unanalyzable region.

In the above, the brightness, the degree of obstruction, and the imaging angle have been described as determination criteria for image quality. In S22 of FIG. 10, the analyzability determination section 92 may use all of these criteria to perform determination. For example, the analyzability determination section 92 determines that a region determined to be unanalyzable based on at least one determination criterion of the brightness, the degree of obstruction, and the imaging angle is the unanalyzable region. However, the analyzability determination section 92 may determine analyzability using some of the determination criteria of the brightness, the degree of obstruction, and the imaging angle.

Figure 11:
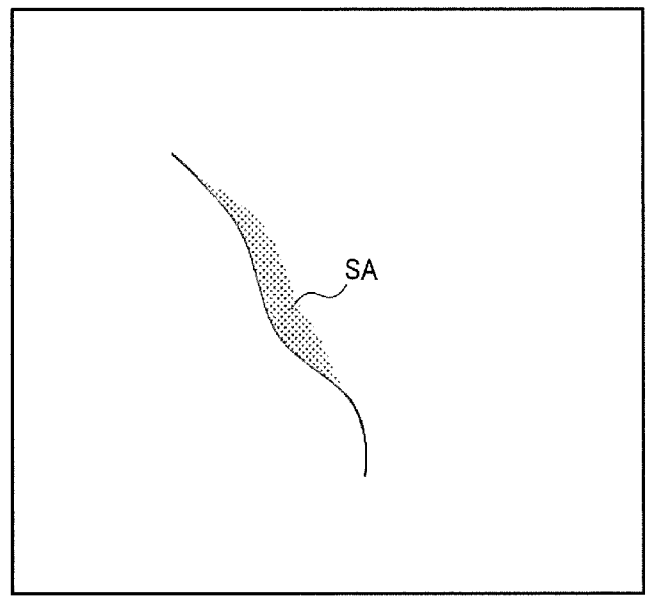
FIG. 11 illustrates an example of a captured image where a hidden portion due to folds or the like is present.

Next, the analyzability determination section 92 detects the presence or absence of a hidden portion to determine analyzability (S23). FIG. 11 illustrates an example of the captured image with folds therein. As shown in FIG. 11, when there is a hidden portion not imaged due to the surface structure of the intestinal tract, such as folds, a dark shadow portion SA is imaged with no illumination light irradiated thereon. The brightness of the dark shadow portion SA gradually decreases in comparison with other portions. Therefore, when a difference in luminance between adjacent pixels or adjacent pixel regions is equal to or larger than a predetermined luminance value, the analyzability determination section 92 determines that there is a hidden portion.

For example, the analyzability determination section 92 determines a given region containing the dark shadow portion SA to be the unanalyzable region.

More specifically, the analyzability determination section 92 acquires information indicating brightness of the captured image. The information indicating brightness is, for example, the luminance described above. Then, when a difference in luminance between adjacent two pixels is a predetermined value or larger or there is a dark streaky portion within a predetermined pixel region in the image, the analyzability determination section 92 determines the target region to be the unanalyzable region.

Alternatively, the analyzability determination section 92 may acquire distance information using a distance sensor or the like. In this case, when a difference in distance between adjacent two pixels is a predetermined value or larger or there is a portion with no continuous change in distance, the analyzability determination section 92 determines the target region to be the unanalyzable region.

Note that the analyzability determination section 92 determines the region, which is determined to have a hidden portion due to folds or the like, to be the second unanalyzable region.

Next, the analyzability determination section 92 determines analyzability based on a region size (S24). Through the processes of steps S22 and S23, either of the analyzable or unanalyzable determination result is acquired for each pixel of the captured image. The analyzability determination section 92 sets the successive pixels determined to be analyzable as one analyzable region. Similarly, the analyzability determination section 92 sets the successive pixels determined to be unanalyzable as one unanalyzable region.

When the size of the analyzable region is no greater than a given size threshold value, the analyzability determination section 92 changes the analyzable region to the unanalyzable region. The size herein is, for example, a size or may be an area on the image. The area on the image is, for example, the total number of pixels included in a target region. When there is no problem with image quality but the area on the image in the target region is extremely small, the region of interest is not imaged in a sufficiently large size, making proper analysis difficult. Therefore, a region with an area no greater than a predetermined value is excluded from the analyzable region, thereby allowing proper determination of analyzability. Note that if an area of a region is larger than the size threshold value but the region is extremely long or wide, proper analysis is also difficult. Therefore, the analyzability determination section 92 may change the analyzable region to the unanalyzable region when at least one of the following is satisfied: the longitudinal length of the analyzable region is no greater than a predetermined value; and the transverse length of the analyzable region is no greater than a predetermined value. Further, the analyzability determination section 92 may perform a process of converting the size on the image to the actual size, and determine analyzability based on the converted size.

Note that the analyzability determination section 92 determines a region, which is determined to be the unanalyzable region due to its small size, to be the first unanalyzable region.

Next, the analyzability determination section 92 determines whether the analysis is performed by a user or not (S25). A case where the analysis is not performed by a user corresponds to a case where the analysis is performed by, for example, the processing device 9. For example, analysis by a system is AI diagnosis using a trained model. Various techniques for generating and using a trained model are known, such as a trained model for a task of detecting a subject and a trained model for a task of classifying malignancy, etc., and these techniques can be widely applied to the present embodiment. Therefore, the detailed description of AI diagnosis is omitted. Further, the system that performs the analysis may be provided separately from the processing device 9.

When a user performs the analysis (Yes in S25), the analyzability determination section 92 determines analyzability based on stability of the image (S26). The stability of the image here represents a degree of motion of the subject between the images captured in time series. The motion includes parallel movement, rotation, vibration, etc., and is caused by the relative movement of the distal end section 11 and the subject. It is assumed that the user determines the presence or absence of a region of interest and malignancy, etc. while watching a moving image. Therefore, even when a captured image in a given frame contains a region determined to be analyzable based on image quality thereof and a region size, low stability of the image in a period including the frame significantly changes the state of the subject on the image, making analysis by the user difficult. Accordingly, the analyzability determination section 92 determines the stability of the image based on the time-series images that contain a captured image to be processed, and when the motion is greater than or equal to a predetermined level, changes the analyzable region contained in the captured image to be processed to the unanalyzable region. Note that the analyzability determination section 92 may perform determination as to respective motion amount of parallel movement, rotation, and vibration, or may obtain an integrated motion amount thereof to compare the obtained motion amount with a threshold value. A degree of motion amount may be determined based on the actual dimensions or the apparent size on the captured image. Note that various techniques for obtaining the motion amount, such as motion vectors and optical flow, are known, and these techniques can be widely applied to the present embodiment.

Note that the analyzability determination section 92 determines a region, which is determined to be the unanalyzable region due to its large motion, to be the first unanalyzable region.

On the other hand, when the user does not perform the analysis (No in S25), appropriate analysis is possible even on an image with low stability. Therefore, the analyzability determination section 92 omits the process of step S26.

The analyzability determination section 92 may output the analysis allowability/non-allowability information based on whether the captured image is analyzable by a computer or not. When using such determination criteria, it is possible to obtain an appropriate analysis result by inputting the captured image determined to be analyzable to the computer. Analyzable by a computer means, for example, accuracy of the analysis result by the computer is greater than or equal to desired accuracy.

More specifically, the captured image may be a biological image. The analyzability determination section 92 outputs the analysis allowability/non-allowability information based on whether a classification process or a detection process can be executed by the computer or not, the classification process being for classifying the biological image into any one of classes, and the detection process being for detecting a region of interest from the biological image. Specifically, the analyzability determination section 92 determines that the classification process or the detection process for a biological image can be performed when the detection or classification accuracy by the computer is expected to be desired accuracy or greater. The class herein may represent either a normal or abnormal state, or a type or malignancy of a lesion.

The computer herein includes a wide variety of devices that perform input, storage, computation, control, output, and other processes. The computer may be a personal computer (PC), a server system, a portable terminal device such as a smartphone or a tablet, or any other devices. Further, the processes performed by the computer may be realized by distributed processing by a plurality of devices, and cloud computing may be used, for example. The computer includes a processor and a memory. The computer may further include an operating interface such as a keyboard, a pointing device, or a touch panel, an output interface such as a monitor or a speaker, and a communication interface such as a display communication chip. The computer performing the analysis may be the processing device 9, the image processing device 3, or any other devices. For example, any of the devices shown in FIG. 1 may also serve as an image diagnostic device that performs the analysis, or the image diagnostic device may be provided separately from each of the devices shown in FIG. 1. Further, the computer may operate according to the instructions from the software that performs the analysis process. For example, a memory may store an analysis program for performing the detection and analysis processes described below, and the processor may function according to the analysis program, thereby realizing the computer that performs the analysis process. Alternatively, the analysis process may be performed by hardware using FPGA or the like. As described above, the computer in the present embodiment includes a wide variety of devices that perform processing electronically, and various modifications can be made to the specific forms of the devices. Further, various modifications can be made to the hardware and software configurations for making the computer execute the analysis.

For example, consider the case where machine learning, such as deep learning, is used to construct a trained model of a detector, a classifier, etc. It is known that inference accuracy is high when parameters in an image to be inferred are similar to those in an image used for training, and low when there is a large discrepancy between the parameters. The image to be inferred is specifically the captured image in the present embodiment. The image used for learning is hereinafter referred to as a training image. The parameters herein are, for example, the brightness, the degree of obstruction, the imaging angle, and the region size.

For example, when training is performed using only somewhat bright training images, it is impossible to obtain sufficient inference accuracy even by inputting a dark image. In light of the above, analyzability by the computer can be determined based on, for example, whether the parameters in the captured image are comparable to those in the training images. More specifically, brightness distribution should be obtained for a plurality of training images used in a training phase. Then, based on the brightness distribution, the brightness threshold described above is set. The same applies to the threshold values of the degree of obstruction and the imaging angle used as the determination criteria.

Alternatively, data may be prepared, in which images for verification are associated with correct labels indicating the presence or absence and a type of the region of interest in the images for verification. The images for verification include captured images of various quality. By comparing output at the time of inputting the images for verification to a trained model with the correct labels, it is possible to obtain the estimation accuracy for each image quality. In this way, it is possible to identify the image quality required for obtaining the desired estimation accuracy. The analyzability determination section 92 outputs the analysis allowability/non-allowability information based on whether the image quality of the captured image is greater than or equal to the identified image quality.

Further, as described above, the analyzability determination section 92 may output the analysis allowability/non-allowability information based on a degree of motion of the subject in the captured image. In this way, when there is a risk that the user cannot observe the subject on the image due to the large motion, for example, the subject is determined to be unanalyzable. For example, even if the subject is imaged with high image quality, constant motion of the subject in a moving image enables determination that the subject is unsuitable for analysis.

Further, the analyzability determination section 92 outputs the analysis allowability/non-allowability information based on the image quality of the captured image. In this way, when analysis cannot be performed due to the poor image quality, it is possible to determine that there is a risk of missing.

Further, the analyzability determination section 92 may divide the captured image into a plurality of regions, and then output the analysis allowability/non-allowability information of each region based on the respective sizes of a plurality of regions. For example, the analyzability determination section 92 divides the captured image into a plurality of regions based on the image quality and the hidden portion as described above. A plurality of regions is the analyzable regions or the unanalyzable regions. One analyzable region is constituted by successive pixels that are determined to be analyzable. In this way, it is possible to prevent a region that is too small to be suitable for analysis from being determined as the analyzable region.

2.3 Association Process

Next, an association process is to be described. Hereinafter, a missed portion determination process and an estimation process of an analyzability rate are described together.

2.3.1 Association

As described above, the analyzability determination is performed using the captured image. However, in order to reduce missed portions in the present embodiment, it is necessary to perform association as to which parts of the lumen structure have the analyzable or unanalyzable region on the captured image. This is because, even by presenting the unanalyzable region on the captured image, it is difficult to understand the relationship between the current position and orientation of the distal end section 11 and the position and orientation of the distal end section 11 required for imaging the unanalyzable region in an analysis allowable state; thus it is difficult to make the user understand the specific operation. In particular, when the unanalyzable region is out of the captured image due to the operation of the insertion section 2b, it is difficult to grasp, from the captured image, the positional relationship between the position and orientation of the distal end section 11 and the unanalyzable region.

In the calculation process of the lumen structure information, the position and orientation of the distal end section 11 and the three-dimensional positions of the feature points in the captured image are presumed. That is, when an image is captured by using the endoscope 2 in parallel with the calculation of the lumen structure information, the feature points on the captured image have already been associated with the lumen structure.

Therefore, the association processing section 94 performs the process of associating the analysis allowability/non-allowability information with the lumen structure information by using the result of the calculation process of the lumen structure information. For example, the association processing section 94 can presume the three-dimensional positions of points other than the feature points in the captured image based on the three-dimensional positions of the feature points. Therefore, the analyzable portion of the lumen structure corresponding to the analyzable region is determined by defining the analyzable region in the captured image using a plurality of points, and presuming the three-dimensional positions of the plurality of points. A plurality of points here is, for example, three or more points set on the outline of the analyzable region.

Alternatively, a plurality of points that defines the analyzable region may be the feature points used for calculation of the lumen structure information. For example, the analyzability determination section 92 may acquire the information of the feature points set for the calculation process of the lumen structure information in advance and perform the analyzability determination based on the feature points. For example, the determination based on the image quality in S22 of FIG. 10 may be performed for each region surrounded by three or more feature points. In this way, the three-dimensional positions of the analyzable and unanalyzable regions can be identified by directly using the information used to acquire the lumen structure information.

Figure 12:
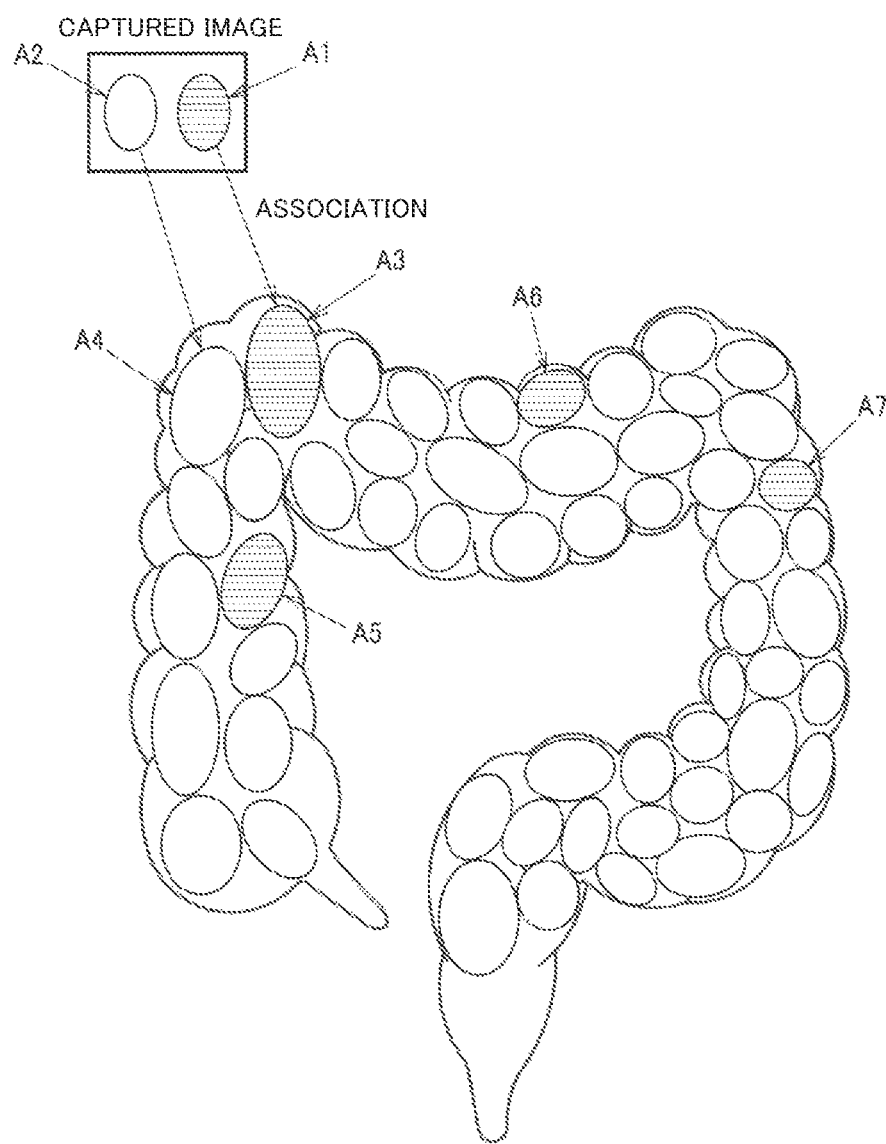
FIG. 12 illustrates an example of association of analysis allowability/non-allowability information with the lumen structure information.

FIG. 12 is a schematic diagram illustrating the process of associating the analysis allowability/non-allowability information with the lumen structure. The analysis allowability/non-allowability information is information for identifying at least one of the analyzable region and the unanalyzable region on the captured image. FIG. 12 illustrates an elliptical analyzable region A2 and unanalyzable region A1, but each of these regions is a polygon defined by, for example, three or more feature points. In the lumen structure information, which is a set of a plurality of feature points with identified three-dimensional positions, the association processing section 94 identifies a closed region surrounded by the feature points that defines the analyzable region as the analyzable portion. For example, the portion corresponding to the analyzable region A2 is determined to be an analyzable portion A4. The association processing section 94 then identifies the region, which was not identified as an analyzable portion of the lumen structure, as an unanalyzable portion.

In addition to the identification of the analyzable portion, the association processing section 94 may identify, in the lumen structure information, a closed region surrounded by the feature points that defines the unanalyzable region, as the unanalyzable portion. For example, a portion on the lumen corresponding to the unanalyzable region A1 is determined to be an unanalyzable portion A3. In this case, a given portion of the lumen structure that is determined to be an unanalyzable portion based on the first captured image may be determined to be an analyzable portion based on the second captured image. When an analyzable portion and an unanalyzable portion overlap in this manner, the overlapped portion is determined to be an analyzable portion. This is because, if the portion is determined to be analyzable based on at least one captured image, it can be analyzed using the captured image with sufficient accuracy.

The processing device 9 outputs the association result. For example, the processing device 9 performs a process of displaying, in a display section such as the monitor 6, the lumen structure information in which the analyzable portion and the unanalyzable portion are displayed in different forms. For example, the unanalyzable portion may be displayed in a color different from the analyzable portion, or may contain animation, such as flashing. A3, A5, A6, and A7 in FIG. 12 are unanalyzable portions, and these portions are displayed in a different color from the analyzable portions such as A4. Further, a display process for improving the visibility of the unanalyzable portions may be performed by displaying objects such as an arrow or text.

When the unanalyzable portion is further divided into the first to third unanalyzable portions described above, the association processing section 94 associates the unanalyzable regions on the captured image with the lumen structure information to identify the unanalyzable portions. Specifically, the portion associated with the first unanalyzable region is the first unanalyzable portion, and the portion associated with the second unanalyzable region is the second unanalyzable portion. Further, the third unanalyzable portion can be detected based on the lack of lumen structure information as described above. If the first and second unanalyzable portions overlap, the association processing section 94 may obtain the final association result based on the size, shape or the like of each unanalyzable portion. In this case, the processing device 9 displays the analyzable portion, the first unanalyzable portion, the second unanalyzable portion, and the third unanalyzable portion in different forms on the monitor 6 or the like.

As described above, the association processing section 94 sets a plurality of feature points on a plurality of captured images captured at two or more timings. Then, the association processing section 94 determines correspondence of a plurality of feature points on the captured images imaged at two or more timings to each other, whereby associating the analysis allowability/non-allowability information with the structure of the lumen. For example, the association processing section 94 acquires the information used in the calculation process of the lumen structure information, specifically, the information of the feature points set in each captured image and the correspondence of the feature points in a plurality of captured images. This makes it possible to associate regions in the captured images with the lumen structure.

The association processing section 94 may define the analyzable region with three or more feature points to identify arrangement of the analyzable region in the lumen, the analyzable region being a region in the captured image determined to be analyzable. Further, the association processing section 94 may define the unanalyzable region with three or more feature points to identify arrangement of the unanalyzable region in the lumen, the unanalyzable region being a region in the captured image determined to be unanalyzable. Further, the association processing section 94 may perform both of these processes. In this way, it is possible to identify the analyzable and unanalyzable portions in the lumen structure as a set of feature points.

Furthermore, the region defined by the three or more feature points may be deformable between a shape in the captured image imaged at a first timing and a shape in the captured image imaged at a second timing.

The lumen may deform over time. For example, the intestinal tract can expand and contract, and its shape changes due to the state of insufflation, the state of pushing of the insertion section 2b, etc. Therefore, a shape of a given region may be deformed between the first and second timings. In this regard, by association tolerant of deformation between two images, it is possible to properly associate the analysis allowability/non-allowability information with the lumen structure even when the lumen is deformed. For example, an image alignment technique called "conformal registration technique" is known and applicable to the present embodiment.

Further, the association processing section 94 may determine a portion of the structure of the lumen, that is determined to be analyzable based on at least one captured image, to be an analyzable portion, and a portion of the structure of the lumen other than the analyzable portion to be an unanalyzable portion. In this way, when imaging the lumen structure such that a plurality of images has overlapping portions, it is possible to appropriately determine which portions remain to be unanalyzable portions.

2.3.2 Missed Portion Determination

The process shown in FIG. 12 allows association of the lumen structure information with the analysis allowability/non-allowability information. In addition, the processing device 9 may detect a missed portion of the unanalyzable portion, for which reinsertion of the insertion section 2b into the depth of the lumen is required.

Figure 13A:
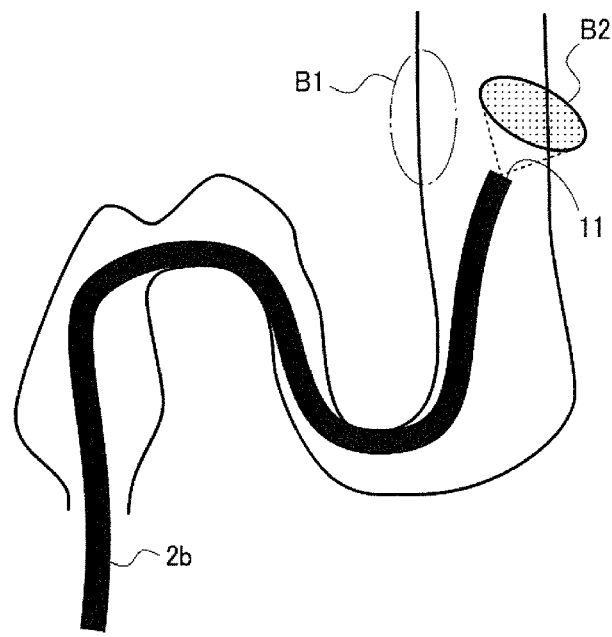
FIGS. 13A and 13B illustrate examples of positional relationship between the distal end section and an unanalyzable portion.
Figure 13B:
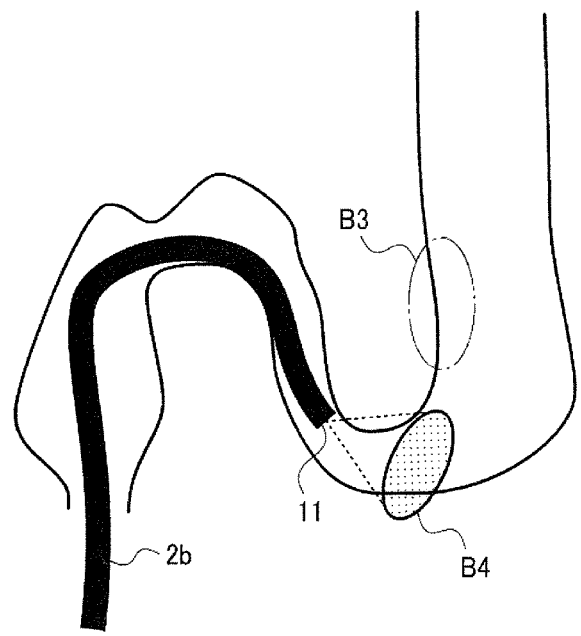

FIGS. 13A and 13B illustrate the positional relationship between the distal end section 11 of the endoscope 2 and the unanalyzable portion. In FIGS. 13A and 13B, B1 and B 3 represent unanalyzable portions, and B2 and B4 represent the field of view of the imaging section. Observation of the intestinal tract using the endoscope system 1 is performed while proximally withdrawing the insertion section 2b after inserting it into the innermost part of the intestinal tract. The innermost part is, for example, the vicinity of the cecum, and the proximal side is the anal side. Even if there is an unanalyzable portion in the vicinity of the distal end section 11 as shown in FIG. 13A, the unanalyzable portion can be imaged by a relatively simple operation. The operation herein is, for example, changing the direction of the curving section 12 or slightly pushing the insertion section 2b.

In contrast, in FIG. 13B, there is an unanalyzable portion on the inner side than a bend section. The bend section is, for example, an SD junction. In order to observe the unanalyzable portion on the inner side than the bend section, an operation to go over the bend section or folds is required.

The missed portion determination section 95 of the present embodiment does not determine the unanalyzable portion shown in FIG. 13A to be a missed portion, but determines the unanalyzable portion shown in FIG. 13B to be a missed portion. Further, when the unanalyzable portion exists in more proximal end side than the current position of the distal end section 11, it is highly probable that it can be observed by subsequent scanning Therefore, the missed portion determination section 95 does not determine the unanalyzable portion in more proximal end side than the current position to be a missed portion. In this way, it is possible to determine the unanalyzable portion, which is likely to be unobservable unless the user performs a clear operation, to be a missed portion.

For example, if there is an unanalyzable portion, the missed portion determination section 95 determines whether or not the unanalyzable portion is in more distal end side of the intestinal tract than the current position of the distal end section 11 by comparing the position of the unanalyzable portion and the current position of the distal end section 11. For example, the missed portion determination section 95 determines the distal end direction and the proximal end direction based on the time-series position information obtained by the process of calculating the lumen structure information. The position information herein may be information acquired by a position/orientation detection sensor such as the magnetic sensor 16, or parameters optimized by using SLAM or SfM. A sensor related to the amount of change in position and orientation, such as a gyro sensor that detects acceleration, may also be used as the position/orientation detection sensor, since such a sensor can detect the position and orientation by repeating the time integration of a detection result as appropriate. As described above, the observation starts from the innermost part of the lumen, and the distal end section 11 thereafter moves in the proximal end direction. Alternatively, when the magnetic sensor 16 or the like is available, the distal and proximal end directions may be determined based on the position and orientation information acquired upon insertion in the distal end direction. The traveling direction upon the insertion is the distal end direction.

If the unanalyzable portion is located more distal end side than the distal end section 11, the missed portion determination section 95 determines whether or not the unanalyzable portion can be imaged by the operation of the curving section 12. The current position and orientation of the curving section 12 is known based on, for example, the control data of the left/right curving operation knob 14a and the up/down curving operation knob 14b. Further, the maximum curving angle or the like of the curving section 12 is known from the design. Therefore, the association processing section 94 can determine whether or not the unanalyzable portion can be imaged by the operation of the curving section 12 based on such information.

The missed portion determination section 95 determines the unanalyzable portion to be a missed portion, the unanalyzable portion being located more distal end side than the distal end section 11 and being determined that it cannot be imaged by the operation of the curving section 12 alone. Further, as described above, it is relatively easy to perform a pushing operation in a short distance so as not to go over the bend section. Therefore, the missed portion determination section 95 may determine whether the unanalyzable portion is a missed portion or not based on not only whether the unanalyzable portion is located in more distal end side than the distal end section 11, but also the distance between the distal end section 11 and the unanalyzable portion, the presence or absence of the bend section or the like.

As described above, the lumen is the intestinal tract, and the insertion section 2b of the endoscope is inserted into depth of the intestinal tract, usually from the anus to the cecum or to the deepest insertable portion of the cecum, then pulled out while capturing an image of the intestinal tract for diagnosis or other purposes. The processing section 9 includes the missed portion determination section 95. The missed portion determination section 95 determines the unanalyzable portion to be a missed portion based on the position and orientation information of the distal end section 11 of the insertion section 2b relative to the intestinal tract, the unanalyzable portion being determined to be unobservable unless reinserting the insertion section 2b into the depth. For example, as shown in FIG. 3, the missed portion determination section 95 acquires the result of associating the analysis allowability/non-allowability information with the lumen structure information from the association processing section 94, and acquires the position and orientation information of the distal end section 11 from the lumen structure detection device 5. Alternatively, as described later with reference to FIG. 15, the processing device 9 includes the position and orientation information acquisition section 97, and the missed portion determination section 95 may acquire the position and orientation information of the distal end section 11 from the position and orientation information acquisition section 97.

In this way, it is possible to identify a region that is likely to be missed. For example, by presenting a missed portion to the user, it is possible to appropriately prevent missing.

The process is the same even if the unanalyzable portions are classified as, for example, first to third unanalyzable portions. That is, any of the first to third unanalyzable portions that cannot be observed by relatively easy operation is determined to be a missed portion. In this case, the missed portion determination section 95 may classify the missed portion, by classifying missed portions resulting from the first, second, and third unanalyzable portions as a first, second, and third missed portions, respectively. Alternatively, the missed portion determination section 95 may omit the classification of the missed portions.

As described above, the processing device 9 of the present embodiment may associate the analysis allowability/non-allowability information and the missed portion determination result with the lumen structure information. Specifically, the processing device 9 identifies whether each portion of the lumen structure is an analyzable portion, an unanalyzable portion, or a missed portion. In this way, it is possible to associate the acquired information with the lumen structure from multiple perspectives, such as, whether imaging is performed or not, whether analysis is allowable or not, and whether a probability of missing is high or not.

2.3.3 Analyzability Rate

Further, the processing device 9 may perform a process of acquiring an analyzability rate which represents the ratio of the analyzable portion to the entire lumen structure. Since the analyzability rate indicates the range of the lumen structure imaged in an analysis allowable state, it can be used as an indicator to quantify missing. By presenting the analyzability rate during observation using the endoscope 2, it is possible to present to the user the progress of the observation.

For example, the lumen structure information is a polygonal model that is a set of triangles defined by three feature points, and the surface area of the lumen structure is the sum of the areas of a plurality of triangles included in the polygonal model. Further, the analyzable portion of the lumen structure can be identified as a polygon surrounded by three or more feature points as described above, and the area of the polygon can also be calculated based on the areas of one or more triangles. The lumen structure information is not limited to the polygonal model. It would be easily understood by a person skilled in the art that the surface area can be calculated based on a three-dimensional model.

The association processing section 94 obtains the analyzability rate according to the following equation (2). The analyzability rate is, for example, a number between 0 and 1. The analyzability rate may be expressed as a percentage by multiplying the right side of the following equation (2) by 100. This makes it possible to appropriately determine the progress of the inspection being performed. Ideally, the analyzability rate of 100% would allow the inspection to be properly completed. The surface area of the entire lumen is specifically the sum of the area of the analyzable portion and the area of the unanalyzable portion. Further, the association processing section 94 may obtain a miss rate according to the following equation (3). As can be seen from the equations (2) and (3) below, the analyzability rate and the miss rate are only different in whether the focus is on the analyzable portion or the unanalyzable portion, and either can be used.

$$\text{Analyzability rate} = (\text{area of analyzable portion})/(\text{surface area of entire lumen}) \quad (2)$$

$$\text{Miss rate} = (\text{area of unanalyzable portion})/(\text{surface area of entire lumen}) \quad (3)$$

When there is a third unanalyzable portion, no lumen structure information is generated for the portion. Therefore, it may be difficult to estimate the area of the third unanalyzable portion. Especially in a case of presenting the analyzability rate during observation, it is assumed that the lumen structure information of the more proximal end side than the distal end section 11 has not been obtained.

In this case, the association processing section 94 may estimate the lumen structure to obtain the analyzability rate. For example, the association processing section 94 obtains in advance a standard intestinal tract model having an average size and shape and uses the standard intestinal tract model to complement the unanalyzable portion, thereby estimating the overall structure of the lumen. The standard intestinal tract model may be common to all patients, or a plurality of models may be prepared according to age and gender. In addition, when patient-specific information on the intestinal tract is obtained in advance using computed tomography (CT) or magnetic resonance imaging (MRI), such information may be used. It is not precluded to use the standard intestinal tract model to complement the second unanalyzable portion such as a portion hidden by folds.

The standard intestinal tract model herein is assumed to be in the same state as the one during observation using the endoscope 2, for example. During observation of the intestinal tract, it is assumed that the intestinal tract is inflated by insufflation. When using the standard intestinal tract model in a state with no insufflation, the degree of expansion and contraction of the intestinal tract changes greatly between the generated lumen structure information and the standard intestinal tract model, making it difficult to obtain the accurate analyzability rate. Therefore, the association processing section 94 uses the information indicating the intestinal tract being insufflated as the standard intestinal tract model.

However, the lumen structure can be simplified by using the standard intestinal tract model to complement the unanalyzable portion. For example, a cylinder model that omits structures such as folds can be used as the standard intestinal tract model. In other words, the analyzability rate should have reasonable accuracy as an indicator for quantification of missing, and can be simplified for minute individual differences and fine fold structures, etc.

Further, an object of simplification is not limited to the standard intestinal tract model. For example, in a situation where a detailed three-dimensional model is obtained as the lumen structure information, the process of obtaining the analyzability rate may be performed by simplifying the lumen structure information into a cylinder model or the like.

Although the above shows an example of calculating the analyzability rate and the miss rate based on the entire lumen, the method of the present embodiment is not limited thereto. For example, when obtaining the analyzability rate during observation, the analyzability rate, etc. may be calculated according to the equation (4) for a portion of the lumen with high probability that the observation has been completed. In this case, the analyzability rate is the area of the analyzable portion relative to the surface area of the lumen on the more distal end side than the distal end section 11 of the insertion section 2b. The same applies to the miss rate according to the equation (5). In this case, it is expected that the analyzability rate is 1 or the miss rate is 0 in case of no missing, and thus it is possible to evaluate whether the previous inspection was performed properly or not. In consideration of a case of reinsertion or the like performed, the analyzability rate, etc. may be obtained based on the position of the distal end section 11 at the time when it is proximally moved to the anal side during a series of observations. The standard intestinal tract model can be used also in this case.

$$\text{Analyzability rate} = (\text{area of analyzable portion})/(\text{surface area of a portion of lumen with high probability that observation has been completed}) \quad (4)$$

$$\text{Miss rate} = (\text{area of unanalyzable portion})/(\text{surface area of a portion of lumen with high probability that observation has been completed}) \quad (5)$$

As described above, the association processing section 94 may estimate at least one of the areas of the analyzable portion and the unanalyzable portion. This makes it possible to output information suitable for presentation to the user or for evaluation of the user skills. Further, the association processing section 94 may estimate at least one of the shapes of the analyzable portion and the unanalyzable portion. The shape of the analyzable portion and the shape of the unanalyzable portion change according to the state of the distal end section 11 operated by the user. Therefore, the shape of the analyzable portion and the shape of the unanalyzable portion can also be used as information to evaluate the progress of the observation and the user skills. The shape estimation herein includes estimation using the standard intestinal tract model and the simplification process of the analyzable portion, as described above.

Further as described above, the association processing section 94 obtains at least one of the analyzability rate and the miss rate. The analyzability rate may be information indicating area ratio of the analyzable portion relative to the entire inner surface of the lumen as shown in the equation (2), or information indicating area ratio of the analyzable portion relative to a portion of the lumen determined to be observation completed by the association processing section 94 as shown in the equation (4). Further, the miss rate may be information indicating area ratio of the unanalyzable portion relative to the entire inner surface of the lumen as shown in the equation (3), or information indicating the area ratio of the unanalyzable portion relative to the portion of the lumen determined to be observation completed by the association processing section 94 as shown in the equation (5). The entire inner surface of the lumen herein is not limited to the one including exactly whole the inner surface of the lumen.

In this way, it is possible to properly quantify missing. The analyzability rate and the miss rate are useful for presenting the degree of completion of the observation and for evaluating the user skills.

Further, the association processing section 94 may acquire at least one of the analyzability rate and the miss rate by simplifying the shape of the unanalyzable portion. This makes it possible to reduce the burden of calculating the analyzability rate or the like. As described above, the lumen structure information may not be acquired for the unanalyzable portion in the first place, in which case the shape is the estimated one. As a result, the area of the unanalyzable portion used to calculate the analyzability rate or the like includes a certain number of errors. In other words, since calculation with high accuracy is naturally difficult, there is less significance in considering even the complex shape of the unanalyzable portion. By simplifying the shape of the unanalyzable portion, it is possible to efficiently reduce a processing load. As described above, the shape of the analyzable portion can also be simplified.

Further, the lumen is the intestinal tract, and the association processing section 94 may acquire at least one of the analyzability rate and the miss rate based on a reference shape of the intestinal tract. The reference shape herein is, for example, a shape represented by the standard intestinal tract model described above. In this way, it is possible to estimate the appropriate shape and area of the intestinal tract even when the shape of the intestinal tract changes due to the state of insufflation, etc.

The reference shape of the intestinal tract herein corresponds to the shape of the intestinal tract at the time of pulling out the insertion section 2*b* of the endoscope 2 after inserting it into the depth of the intestinal tract. The lumen structure information is calculated based on an image that captures the intestinal tract at the time of pulling out. The intestinal tract at the time of pulling out is specifically the intestinal tract inflated by insufflation. In this way, the state of the intestinal tract represented by the reference shape corresponds to the state of the intestinal tract identified by the lumen structure information, whereby making it possible to acquire the appropriate analyzability rate.

2.4 Presentation Process 2.4.1 Display

The processing device 9 may present the result of associating the analysis allowability/non-allowability information with the lumen structure information to a user by displaying the result on the monitor 6 or the like. For example, when the analysis allowability/non-allowability information is acquired during observation, the processing device 9 displays the captured image and the result of associating the analysis allowability/non-allowability information with the lumen structure information on the monitor 6.

Figure 14:
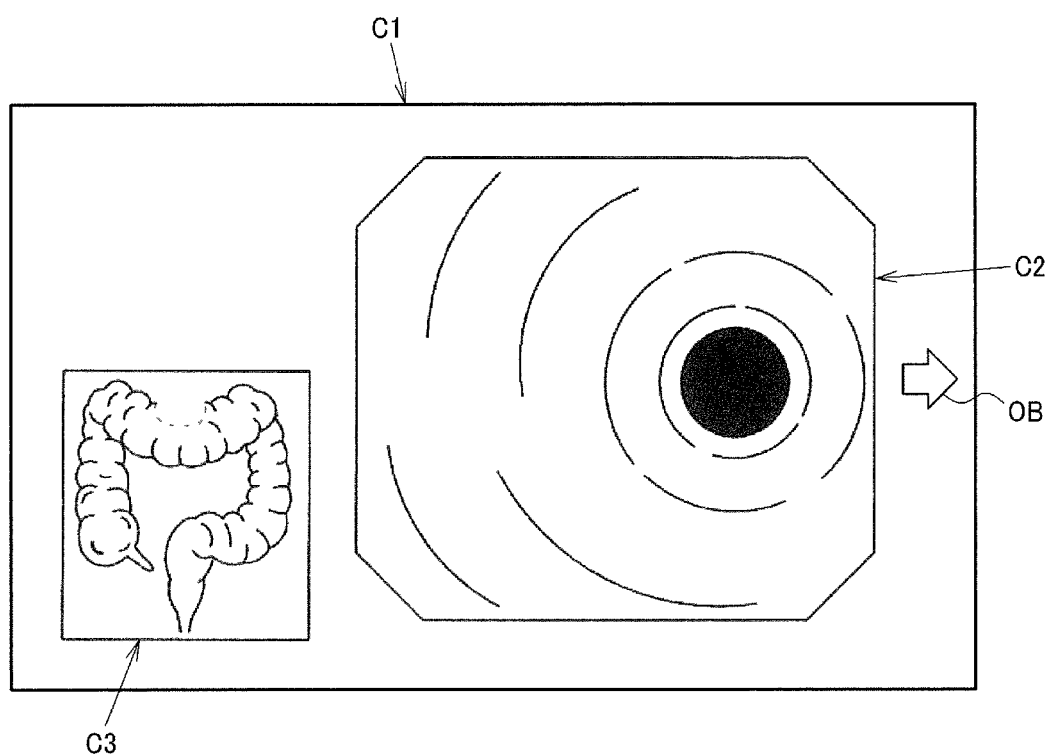
FIG. 14 illustrates an example of a displayed image.

FIG. 14 illustrates an example of a displayed image displayed on the monitor 6 or the like. C1 represents the displayed image, C2 represents a first region that is a part of the displayed image, and C3 represents a second region that is the other part of the displayed image. For example, as shown in FIG. 14, the processing device 9 displays the captured image in the first region of the monitor 6 and the lumen structure information in the second region different from the first region. Although omitted in FIG. 14, the result of associating the analysis allowability/non-allowability information with the lumen structure information may be displayed in the second region. The result of associating the analysis allowability/non-allowability information with the lumen structure information is a three-dimensional model, and the point-of-view may be changeable based on user input. Further, the lumen structure information is not limited to the three-dimensional model, and may be a two-dimensional image of an expanded cylinder. In this case, the result of associating the analysis allowability/non-allowability information with the lumen structure information is also a two-dimensional image. Further, both the three-dimensional model and the two-dimensional image of the association result may be displayed simultaneously.

Thus, by presenting which portion of the lumen can be analyzed or not in light of the lumen structure, it is possible to facilitate judgement to prevent missing by a physician or the like. Further, by determining an unanalyzable portion for which reinsertion is required to be a missed portion, it is possible to present information or warnings to a physician or the like.

2.4.2 Guide

Additionally, the processing device 9 may include the guide processing section 96 as shown in FIG. 3. The guide processing section 96 provides a guide to improve visibility of the subject in the captured image when information indicating that at least part of the captured image is unanalyzable is output as the analysis allowability/non-allowability information. For example, the guide processing section 96 provides a guide to improve image quality. The guide herein may be to instruct the user to: change the distance between the subject and the distal end section 11; supply air or water; change the imaging angle; or hold the distal end section 11 still to suppress blurring. The guide processing section 96 performs a process of displaying text or other information on the monitor 6, which instructs the above adjustments.

Further, the guide processing section 96 may instruct specific adjustments. For example, the guide processing section 96 performs a process of indicating a specific position of an obstacle or a direction of water supply. Alternatively, the guide processing section 96 may perform a process of indicating the amount of insertion/withdrawal of the insertion section 2*b*, the curving direction and angle of the curving section 12, etc. to change the imaging angle. This makes it possible to encourage the user to perform operation for imaging in an analysis allowable state.

Further, when there is a missed portion, the guide processing section 96 may provide a guide to image the missed portion in an analysis allowable state. For example, the guide processing section 96 may display the positional relationship between the field of view currently being imaged and the missed portion on the captured image. For example, a guide object such as an arrow is displayed, indicating in which direction, including up, down, left, and right, the view should be moved. The direction of movement may also include forward and backward directions. This makes it possible to encourage the user to perform operation to image the missed portion. Further, the guide object is not limited to those displayed on the captured image. For example, the guide processing section 96 may control to display the captured image in a part of the display region of the monitor 6 or the like, and display the guide object in a region outside the captured image in the display region. The guide object is, for example, an arrow-shaped object OB illustrated in FIG. 14. The guide object in FIG. 14 is displayed in a region of the displayed image that is different from both the first and second regions.

3. Modifications 3.1 Modifications in Acquisition of Lumen Structure Information Described above is the example in which the lumen structure information is acquired in the lumen structure detection device 5, which is different from the processing device 9. However, the method of the present embodiment is not limited thereto. The lumen structure information may be calculated in the processing device 9.

FIG. 15 illustrates another configuration of the processing device 9. As shown in FIG. 15, the processing device 9 includes the position and orientation information acquisition section 97 and a drive circuit 98 in addition to the components shown in FIG. 3. The position and orientation information acquisition section 97 corresponds to the position/orientation detection section 55 in FIG. 4. The drive circuit 98 corresponds to the drive circuit 56. That is, the position and orientation information acquisition section 97 controls the drive circuit 98 that drives the magnetic field generating device 7 to make the magnetic field generating device 7 generate a predetermined magnetic field. The position and orientation information acquisition section 97 detects the magnetic filed by the magnetic sensor 16 to generate the position coordinates and orientation data of the distal end section 11.

The lumen structure information acquisition section 93 calculates the lumen structure information based on a captured image from the image acquisition section 91 and the position and orientation information from the position and orientation information acquisition section 97. That is, the lumen structure information acquisition section 93 in FIG. 15 performs the same process as the processor 51 in FIG. 4.

However, as mentioned in the above description of the lumen structure detection device 5, the sensor for detecting the position and orientation information is not limited to the magnetic sensor 16 provided in the distal end section 11. Modifications can be made such as those illustrated in FIGS. 9A and 9B etc. In addition, the position/orientation detection sensor such as the magnetic sensor 16 can be omitted in the method of the present embodiment. In this case, the lumen structure information acquisition section 93 performs the process of optimizing (6k+3m) parameters, including the position and orientation of the distal end section 11, based on the captured image, for example.

As described above, the lumen structure information acquisition section 93 may acquire the lumen structure information based on the captured image. In this way, the processing device 9 can perform the processes of acquiring the lumen structure information, acquiring the analysis allowability/non-allowability information, and associating the analysis allowability/non-allowability information with the lumen structure.

As shown in FIG. 15, the processing device 9 may include the position and orientation information acquisition section 97 that acquires the position and orientation information of the distal end section 11 relative to the lumen from a sensor provided in the insertion section 2b to be inserted in the lumen. The lumen structure information acquisition section 93 acquires the lumen structure information based on the position and orientation information acquired by the position and orientation information acquisition section 97 and the captured image.

Thus, by acquiring the position and orientation information of the distal end section 11 using a sensor such as the magnetic sensor 16, a highly accurate three-dimensional model structure of the lumen can be calculated at high speed.

3.2 Real-Time Processing and Post-Processing

Described above is the example in which acquisition of the lumen structure information and the analysis allowability/non-allowability information and association thereof are performed in real time during observation. In this case, it is necessary to promptly present possibility of missing a lesion. When there is a missed portion as shown in FIG. 13B, reinsertion is required to observe the missed portion, which places a heavy burden on a physician and a patient. It is useful to promptly indicate the presence of the unanalyzable portion to prevent occurrence of the missed portion.

Therefore, in a case where each process is performed during observation, high-speed processing is important. For example, SLAM is suitable for performing the process for the lumen structure information during observation. SLAM has a high real-time property since it sequentially processes acquired images. This makes it possible to present the unanalyzable portion to a physician or the like at the time of occurrence thereof, thereby encouraging confirmation of the unanalyzable portion. Also in a case where there is a missed portion, it is possible to encourage confirmation of the missed portion before the observation is completed, thereby preventing ultimate missing. For observation using the endoscope system 1, a user is required to make preparations such as dietary restrictions and taking a purgative. Even if reinsertion is required, a burden on a patient can be reduced compared to performing a second observation separately.

On the other hand, each of the above processes may be performed after the observation is completed. In this case, it is unlikely to cause a problem even if the processing takes several minutes to several hours. Therefore, it is possible to prioritize accuracy over speed in each process. For example, a method such as SfM may be used for acquiring the lumen structure information. SfM can use a whole set of acquired images as input so that it can enhance the accuracy of lumen structure estimation compared to SLAM.

In a case of acquiring the lumen structure information and presenting the association result of the analysis allowability/non-allowability information after the fact, a missed portion would be found after completion of observation. Therefore, it is necessary to perform a separate observation in order to analyze the missed portion. The association result acquired after the fact can be used, for example, to quantify missing. Specifically, it is possible to determine the user skills, perform user training, etc. based on the association result. A specific indicator includes the above-mentioned analyzability rate and the miss rate.

3.3 Modifications in Acquisition Timing of Lumen Structure Information

Described above is the example in which the process of acquiring the lumen structure information and the output and association processes of the analysis allowability/non-allowability information are performed for the identical observation using the endoscope system 1. For example, in a case of performing real time processing during observation, once a captured image is acquired, output of the analysis allowability/non-allowability information based on the captured image and calculation of the lumen structure information based on the captured image are performed in parallel, and then the analysis allowability/non-allowability information is associated with the lumen structure information. Also in a case of targeting a moving image stored in the storage or the like after observation, output of the analysis allowability/non-allowability information and calculation of the lumen structure information are performed based on the moving image.

However, the method of the present embodiment is not limited thereto. The lumen structure information may be acquired prior to the observation that is subjected to the output process of the analysis allowability/non-allowability information. For example, when the same patient is the subject of the observation, the lumen structure information is acquired in advance based on the captured image imaged in the past observation. Then, based on the captured image imaged during the current observation, output of the analysis allowability/non-allowability information and the association of the analysis allowability/non-allowability information with the lumen structure are performed.

The lumen structure information is, for example, a set of feature points, and the feature points in this case are set based on the past captured image. Since no feature points are set in the captured image to be used for calculation of the analysis allowability/non-allowability information, the analysis allowability/non-allowability information as it is cannot be associated with the lumen structure.

Accordingly, the association processing section 94 may acquire highly accurate position and orientation information based on a sensor such as the magnetic sensor 16. In this case, the conditions for setting the reference point in the coordinate system are set in the same way as in the past observation. Specifically, the anus as the reference point and the posture of the user are in common. If the past reference point corresponds to the current reference point in this way, the positional relationship between the distal end section 11 and the intestinal tract in the current observation can be presumed. That is, the association processing section 94 can identify, based on the position and orientation information of the distal end section 11, which portion of the intestinal tract represented by the lumen structure information corresponds to the subject imaged in the captured image. This allows the association processing section 94 to associate the analysis allowability/non-allowability information acquired by the current observation with the lumen structure information acquired by the past observations.

Alternatively, the association processing section 94 may perform a matching process between the past captured image and the current captured image. This makes it possible to identify which feature point set in the past captured image corresponds to which position in the current captured image. In this way, the position of the subject imaged in the current captured image can be identified on the lumen structure.

Alternatively, the lumen structure information may be acquired by using CT, MRI, an ultrasonic diagnostic device, or the like. Also in this case, the association processing section 94 desirably acquires the highly accurate position and orientation information based on a sensor such as the magnetic sensor 16. By identifying the positional relationship between the reference point of the position and orientation information detected by the sensor and the lumen structure information acquired using CT or the like, the positional relationship between the distal end section 11 and the intestinal tract can be presumed with high accuracy. As a result, the position of the subject imaged in the captured image can be identified on the lumen structure.

3.4 Control Based on Association Result

Described above is the example of using the result of associating the analysis allowability/non-allowability information with the lumen structure information for presentation to the user or evaluation of the user skills. In addition, the guide by the guide processing section 96 is described as an example of presentation to the user. However, the method of the present embodiment is not limited thereto. The association result may be used to control the endoscope 2.

For example, the endoscope 2 includes a motor (not illustrated) or the like and a drive section that drives the motor or the like. In the endoscope 2, insertion and withdrawal of the insertion section 2b and curving of the curving section 12 are automatically performed based on control of the motor or the like. In a case where such endoscope 2 is used, the processing device 9 outputs the association result to the control section that controls the drive section. The control section may be provided in the image processing device 3 or the processing device 9. The control section controls the drive section based on the association result. For example, when a missed portion is detected, the control section controls to insert the insertion section 2b to a position allowing imaging of the missed portion, or to curve the curving section 12. The control section may perform control to improve the image quality. The control to improve image quality may be, for example, control to change the position and orientation of the distal end section 11, or control to supply water and air.

Although the embodiments to which the present disclosure is applied and the modifications thereof have been described in detail above, the present disclosure is not limited to the embodiments and the modifications thereof, and various modifications and variations in components may be made in implementation without departing from the spirit and scope of the present disclosure. The plurality of elements disclosed in the embodiments and the modifications described above may be combined as appropriate to implement the present disclosure in various ways. For example, some of all the elements described in the embodiments and the modifications may be deleted. Furthermore, elements in different embodiments and modifications may be combined as appropriate. Thus, various modifications and applications can be made without departing from the spirit and scope of the present disclosure. Any term cited with a different term having a broader meaning or the same meaning at least once in the specification and the drawings can be replaced by the different term in any place in the specification and the drawings.

What is claimed is:

1. A processing device comprising:
a processor comprising hardware, the processor being configured to:
acquire a captured image of an inside of a lumen;
acquire lumen structure information indicating a structure of the lumen;
determine whether the captured image can be analyzed or not and output analysis allowability/non-allowability information indicating whether the captured image is in an analysis allowable state or not based on the captured image and first determination criteria;
associate the analysis allowability/non-allowability information with the structure of the lumen based on the analysis allowability/non-allowability information and the lumen structure information to identify an analyzable portion and an unanalyzable portion of the structure of the lumen; and
determine that a portion of the identified unanalyzable portion determined to meet second determination criteria is a missed portion based on position and orientation information of a distal end of an insertion section to be inserted in the lumen,
wherein:
the lumen is an intestinal tract; and
in a case where the insertion section is inserted into a depth of the intestinal tract and then pulled out while capturing an image of the intestinal tract, the second determination criteria is criteria that a portion is unobservable unless reinserting the insertion section into the depth.

2. The processing device as defined in claim 1, wherein the processor is configured to output the analysis allowability/non-allowability information based on whether the captured image can be analyzed by a computer or not.

3. The processing device as defined in claim 2, wherein:
the captured image is a biological image, and
the processor is configured to output the analysis allowability/non-allowability information based on whether a classification process or a detection process can be executed by the computer or not, the classification process being for classifying the biological image into any of classes and the detection process being for detecting a region of interest from the biological image.

4. The processing device as defined in claim 1, wherein the processor is configured to determine the captured image to be analyzable when a degree of motion of a subject in the captured image is no greater than a predetermined value and the motion is maintained for a prescribed time.

5. The processing device as defined in claim 1, wherein the processor is configured to determine the captured image to be analyzable when quality of the captured image is greater than or equal to a predetermined reference value.

6. The processing device as defined in claim 1, wherein the processor is configured to determine the captured image to be analyzable when the captured image is divided into a plurality of regions such that each size of a plurality of the regions is greater than or equal to a predetermined value.

7. The processing device as defined in claim 1, wherein the processor is configured to acquire the lumen structure information based on the captured image.

8. The processing device as defined in claim 1, wherein the processor is configured to:
acquire the position and orientation information of the distal end of the insertion section relative to the lumen from a sensor provided in the insertion section; and
acquire the lumen structure information based on the position and orientation information and the captured image.

9. The processing device as defined in claim 1, wherein the processor is configured to:
set a plurality of feature points in each of a plurality of the captured images captured at two or more timings; and
determine correspondence of a plurality of the feature points in the captured images captured at the two or more timings to each other, whereby associating the analysis allowability/non-allowability information with the structure of the lumen.

10. The processing device as defined in claim 9, wherein the processor is configured to perform at least one of:
a process of defining an analyzable region with the three or more feature points to identify arrangement of the analyzable region in the lumen, the analyzable region being a region in the captured image determined to be analyzable; and
a process of defining an unanalyzable region with the three or more feature points to identify arrangement of the unanalyzable region in the lumen, the unanalyzable region being a region in the captured image determined to be unanalyzable.

11. The processing device as defined in claim 10, wherein the region defined by the three or more feature points is deformable between a shape in the captured image captured at a first timing and a shape in the captured image captured at a second timing.

12. The processing device as defined in claim 1, wherein the processor is configured to:
determine that a portion of the structure of the lumen determined to be analyzable based on at least one captured image is the analyzable portion; and
determine that a portion of the structure of the lumen other than the analyzable portion is the unanalyzable portion.

13. The processing device as defined in claim 1, wherein the processor is configured to estimate at least one of an area of the analyzable portion, a shape of the analyzable portion, an area of the unanalyzable portion, and a shape of the unanalyzable portion.

14. The processing device as defined in claim 13, wherein:
the processor is configured to perform a process of acquiring at least one of an analyzability rate and a miss rate;
the analyzability rate is information indicating area ratio of the analyzable portion relative to an entire inner surface of the lumen or information indicating area ratio of the analyzable portion relative to a portion of the lumen determined to have been observed; and
the miss rate is information indicating area ratio of the unanalyzable portion relative to the entire inner surface of the lumen or information indicating area ratio of the unanalyzable portion relative to a portion of the lumen determined to have been observed.

15. The processing device as defined in claim 14, wherein the processor is configured to acquire at least one of the analyzability rate and the miss rate by simplifying the shape of the unanalyzable portion.

16. The processing device as defined in claim 14, wherein:
the lumen is an intestinal tract; and
the processor is configured to acquire at least one of the analyzability rate and the miss rate based on a reference shape of the intestinal tract.

17. The processing device as defined in claim 1, wherein when the missed portion is present, the processor is configured to perform a guide process to capture the missed portion in the analysis allowable state.

18. An endoscope system comprising:
a processor comprising hardware; and
an imaging device configured to capture an image of an inside of a lumen,
wherein the processor is configured to:
acquire a captured image based on the imaging device;
acquire lumen structure information indicating a structure of the lumen;
determine whether the captured image can be analyzed or not and output analysis allowability/non-allowability information indicating whether the captured image is in an analysis allowable state or not based on the captured image and first determination criteria;
associate the analysis allowability/non-allowability information with the structure of the lumen based on the analysis allowability/non-allowability information and the lumen structure information to identify an analyzable portion and an unanalyzable portion of the structure of the lumen; and
determine that a portion of the identified unanalyzable portion determined to meet second determination criteria is a missed portion based on position and orientation information of a distal end of an insertion section to be inserted in the lumen, and
wherein:
the lumen is an intestinal tract; and
in a case where the insertion section is inserted into a depth of the intestinal tract and then pulled out while capturing an image of the intestinal tract, the second determination criteria is criteria that a portion is unobservable unless reinserting the insertion section into the depth.

19. A method for processing a captured image, the method comprising:
acquiring a captured image capturing an inside of a lumen;
acquiring lumen structure information indicating a structure of the lumen;
determining whether the captured image can be analyzed or not and outputting analysis allowability/non-allowability information indicating whether the captured image is in an analysis allowable state or not based on the captured image and first determination criteria;
associating the analysis allowability/non-allowability information with the structure of the lumen based on the analysis allowability/non-allowability information and the lumen structure information to identify an analyzable portion and an unanalyzable portion of the structure of the lumen; and determining that a portion of the identified unanalyzable portion determined to meet second determination criteria is a missed portion based on position and orientation information of a distal end of an insertion section to be inserted in the lumen, wherein:

the lumen is an intestinal tract; and in a case where the insertion section is inserted into a depth of the intestinal tract and then pulled out while capturing an image of the intestinal tract, the second determination criteria is criteria that a portion is unobservable unless reinserting the insertion section into the depth.

* * * * *